United States Patent
Ueda et al.

(10) Patent No.: US 12,422,410 B2
(45) Date of Patent: Sep. 23, 2025

(54) STRUCTURE EVALUATION SYSTEM, STRUCTURE EVALUATION APPARATUS, AND STRUCTURE EVALUATION METHOD

(71) Applicants: Kabushiki Kaisha Toshiba, Tokyo (JP); Kyoto University, Kyoto (JP)

(72) Inventors: Yuki Ueda, Kawasaki (JP); Hidefumi Takamine, Shinagawa (JP); Kazuo Watabe, Yokohama (JP); Tomoki Shiotani, Kyoto (JP)

(73) Assignees: Kabushiki Kaisha Toshiba, Tokyo (JP); Kyoto University, Kyoto (JP)

( * ) Notice: Subject to any disclaimer, the term of this patent is extended or adjusted under 35 U.S.C. 154(b) by 505 days.

(21) Appl. No.: 17/466,260

(22) Filed: Sep. 3, 2021

(65) Prior Publication Data
US 2021/0396715 A1    Dec. 23, 2021

Related U.S. Application Data

(63) Continuation of application No. PCT/JP2019/049607, filed on Dec. 18, 2019.

(51) Int. Cl.
*G01N 29/12* (2006.01)
*G01N 29/14* (2006.01)

(52) U.S. Cl.
CPC .......... *G01N 29/14* (2013.01); *G01N 29/12* (2013.01); *G01N 2291/0234* (2013.01)

(58) Field of Classification Search
CPC .... G01N 29/12; G01N 29/14; G01N 2203/06; G01M 5/0008; G01M 5/0033; G01M 5/0066
See application file for complete search history.

(56) References Cited

U.S. PATENT DOCUMENTS 5,540,096 A * 7/1996 Woodcock ............. G01N 29/11
                                                    73/579
2016/0084803 A1   3/2016 Takamine et al.

FOREIGN PATENT DOCUMENTS

| EP | 3 761 022 A1 | 1/2021 |
| JP | 2003-315317 A | 11/2003 |
| JP | 2005291735 A * | 10/2005 |
| JP | 2012-251391 A | 12/2012 |
| JP | 2016-61701 A | 4/2016 |

(Continued)

OTHER PUBLICATIONS

Ercolino et al.; Detection of onset of failure in prestressed strands by cluster analysis of acoustic emissions; 2015; Structural Monitoring and Maintenance, vol. 2., No. 4, pp. 339-355. (Year: 2015).*

(Continued)

*Primary Examiner* — Daniel J Colilla
(74) *Attorney, Agent, or Firm* — Oblon, McClelland, Maier &Neustadt, L.L.P.

(57) ABSTRACT

A structure evaluation system includes a plurality of sensors and an evaluator. The plurality of sensors detect elastic waves generated in prestressed concrete in which a prestressed concrete steel material is internally provided. The evaluator evaluates a breakage of the prestressed concrete steel material based on elastic waves detected for a second period, which is a period after the elapse of a first period from a point in time when a magnitude of the elastic waves detected by the plurality of sensors is greater than or equal to a threshold value.

6 Claims, 12 Drawing Sheets

(56) References Cited

FOREIGN PATENT DOCUMENTS

JP        2018-063268 A    4/2018
WO   WO 2019/167137 A1   9/2019

OTHER PUBLICATIONS

Shiotani et al., "Temporal and spatial evaluation of grout failure process with PC cable breakage by means of acoustic emission", Construction and Building Materials, vol. 48, 2013, 7 pages.

\* cited by examiner

STRUCTURE EVALUATION SYSTEM, STRUCTURE EVALUATION APPARATUS, AND STRUCTURE EVALUATION METHOD

This is a Continuation Application of International Application PCT/JP2019/049607, filed on Dec. 18, 2019, and the entire contents of all of which are incorporated herein by reference.

FIELD

Embodiments described herein relate generally to a structure evaluation system, a structure evaluation apparatus, and a structure evaluation method.

BACKGROUND

Prestressed concrete is concrete in which the tensile strength is increased by introducing prestress into the concrete in advance. The prestressed concrete is used for various structures such as bridges and bridge girders because it is effective for crack control in concrete members, reduction in sizes of members, and the like. However, the prestressed concrete internally includes members that are not used in reinforced concrete such as prestressed concrete (PC) steel materials (for example, PC cables). Thus, deterioration different from that of general reinforced concrete may occur. The deterioration different from that of the general reinforced concrete is, for example, a breakage of a PC steel material.

In the prestressed concrete, the prestress is introduced by the PC steel material, so that the prestress may disappear due to a breakage of the PC steel material. In this case, the performance of the prestressed concrete deteriorates. In the worst case, because a structure made of the prestressed concrete may be destroyed, it is necessary to pay particular attention to a state of the PC steel material. The breakage of the PC steel material can be determined by detecting elastic waves generated due to the breakage of the PC steel material with a sensor. However, the sensor cannot distinguish between the breakage of the PC steel material and noise when the noise is generated due to the running of an automobile or the like. Thus, erroneous evaluation may be caused.

DETAILED DESCRIPTION

Figure 1:
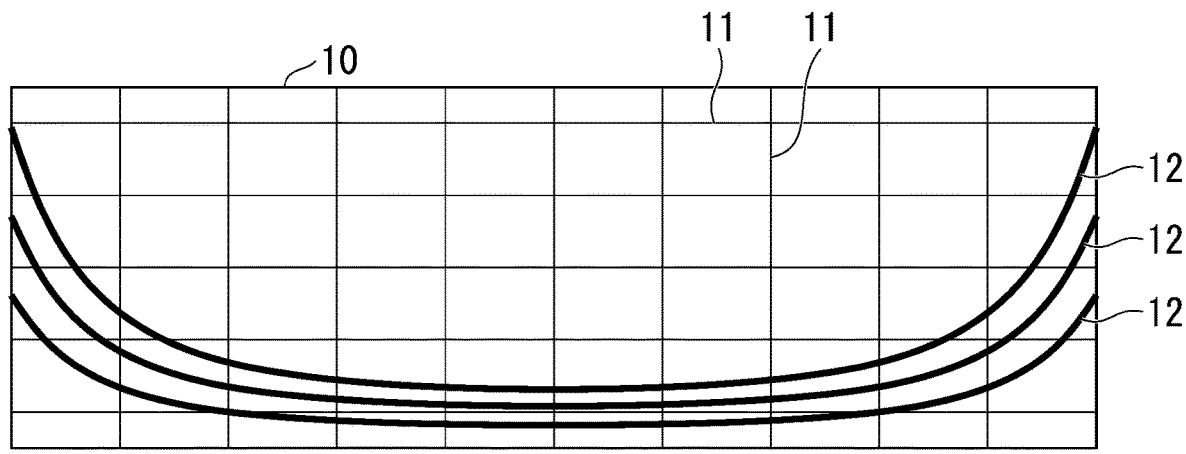
FIG. 1 is a diagram showing an example of prestressed concrete used in the present embodiment.

The present invention provides a problem to be solved by the present invention is to provide a structure evaluation system, a structure evaluation apparatus, and a structure evaluation method capable of evaluating a breakage of a steel material included in prestressed concrete accurately.

According to one embodiment, a structure evaluation system includes a plurality of sensors and an evaluator. The plurality of sensors detect elastic waves generated in prestressed concrete in which a prestressed concrete steel materials is internally provided. The evaluator evaluates a breakage of the steel material on the basis of elastic waves detected for a second period which is a period after the elapse of a first period from a point in time when a magnitude of the elastic waves detected by the plurality of sensors is greater than or equal to a threshold value.

Hereinafter, a structure evaluation system, a structure evaluation apparatus, and a structure evaluation method of embodiments will be described with reference to the drawings.

Overview

The structure evaluation system according to the embodiment is used to evaluate a breakage of a steel material of prestressed concrete constituting a structure accurately. The prestressed concrete according to the embodiment is, for example, post-tension type prestressed concrete and a sheath is included inside the prestressed concrete. A PC steel material is fixed within the sheath by grout. When the above breakage of PC steel material is occurred, elastic waves are generated inside the prestressed concrete. The elastic waves can be detected by sensors. However, the sensor cannot distinguish between the breakage of the PC steel material and the noise when noise is generated due to the running of an automobile or the like. Thus, erroneous evaluation may be caused.

Incidentally, after the breakage of PC steel material is occurred, elastic waves are generated separately from the elastic waves generated due to the breakage. This is because the PC steel material in an unstable state after a breakage settles in a stable state with the grout in the sheath, i.e., a so-called re-fixed state, and friction or the like occurs due to the re-fixation. The elastic waves generated due to the above re-fixation can also be detected by the sensor. Thus, by detecting the elastic waves generated due to the re-fixation, the breakage can be evaluated as the breakage of the PC steel material instead of the noise. However, for a certain period from the breakage of the PC steel material, the elastic waves generated due to the re-fixation are hidden in the elastic waves generated due to the breakage and the evaluation cannot be performed accurately.

Therefore, a structure evaluation system according to the embodiment includes a plurality of sensors configured to detect elastic waves generated in prestressed concrete; and an evaluator configured to evaluate a breakage of a steel material using elastic waves detected for a second period which is a period after the elapse of a first period from a point in time when a magnitude of the elastic waves detected by the plurality of sensors is greater than or equal to a threshold value. For the first period from a point in time when elastic waves whose magnitude is greater than or equal to the threshold value like elastic waves generated due to a breakage of a PC steel material has been detected, elastic waves generated due to re-fixation are hidden in elastic waves generated due to the breakage. Therefore, an influence of the elastic waves generated due to the breakage is reduced by using the elastic waves detected for the second period, which is a period after the elapse of the first period. By reducing the influence of the elastic waves generated due to the breakage as described above, it is easier to detect elastic waves generated due to re-fixation. As a result, it can be determined that the elastic waves of the threshold value or more are not the noise but are the elastic waves generated due to the breakage. Thus, it is possible to evaluate the breakage of the steel material of the prestressed concrete accurately.

FIG. 1 is a diagram showing an example of prestressed concrete used in the present embodiment. In FIG. 1, post-tension type prestressed concrete is shown as prestressed concrete 10. Here, in the prestressed concrete 10 of the present embodiment, elastic waves are generated due to a breakage of the PC steel material, generation or growth of cracks, or an external impact (for example, rain, artificial rain, or the like). The prestressed concrete 10 is used for structures such as bridges, bridge girders, and bedrock. The bridges are not limited to structures built over a river, a valley, and the like and include various structures (for example, viaducts of expressways) provided above the ground and the like. The prestressed concrete 10 may be used for various structures other than the above structures.

The prestressed concrete 10 internally includes a plurality of reinforcing bars 11 or one or more sheaths. The plurality of reinforcing bars 11 are arranged so that the reinforcing bars 11 intersect each other. For example, the plurality of reinforcing bars 11 are arranged so that the reinforcing bars 11 intersect each other by arranging a plurality of reinforcing bars 11 in a vertical direction and arranging a plurality of reinforcing bars 11 in a horizontal direction. The sheath 12 is a cylindrical cross-sectional pod that allows the passing through of a PC steel material. Although an example in which three sheaths 12 are included in the prestressed concrete 10 is shown in FIG. 1, the number of sheaths 12 included in the prestressed concrete 10 may be any number. Within each sheath 12, one or more PC steel materials are fixed by grout.

The grout is a filling material that integrates a concrete member with a PC steel material and protects the PC steel material from rust. By introducing the PC steel material into the prestressed concrete 10, a compressive force is applied to the prestressed concrete 10. Thereby, the prestressed concrete 10 is capable of counteracting the stress corresponding to a load when the load has been received, so that cracks are less likely to occur. By arranging the sensor on the surface of the prestressed concrete 10, elastic waves generated when the PC steel material breakage can be detected. Also, by arranging a plurality of sensors on the surface of the prestressed concrete 10, it is possible to identify a breakage area of the PC steel material from an arrival time difference between elastic waves and the like.

Figure 2:
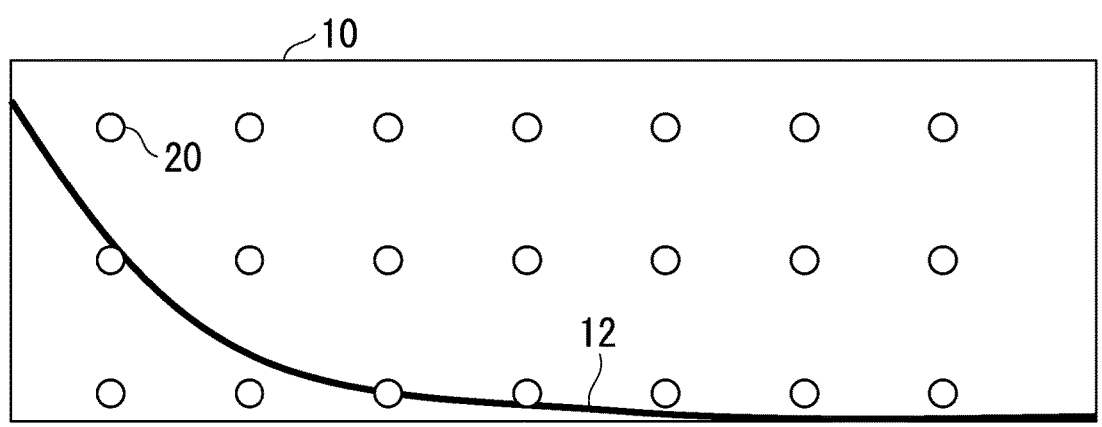
FIG. 2 is a diagram showing an example of an arrangement of sensors according to the embodiment.

FIG. 2 is a diagram showing an example of an arrangement of the sensors 20 according to the embodiment.

It is difficult to ascertain the breakage area of the PC steel material in the prestressed concrete 10 only by looking at the prestressed concrete 10 externally. Thus, it is necessary to arrange the sensors 20 so that the elastic waves can be detected even though the PC steel material breakage at any position within the prestressed concrete 10. Therefore, in the following embodiment, a case in which a plurality of sensors 20 (for example, 21 sensors 20 in FIG. 2) are arranged so that elastic waves can be detected on one entire surface of the prestressed concrete 10 as shown in FIG. 2 will be described as an example. The number of sensors 20 is not particularly limited as long as they can cover one entire surface of the prestressed concrete 10.

First Embodiment

Figure 3:
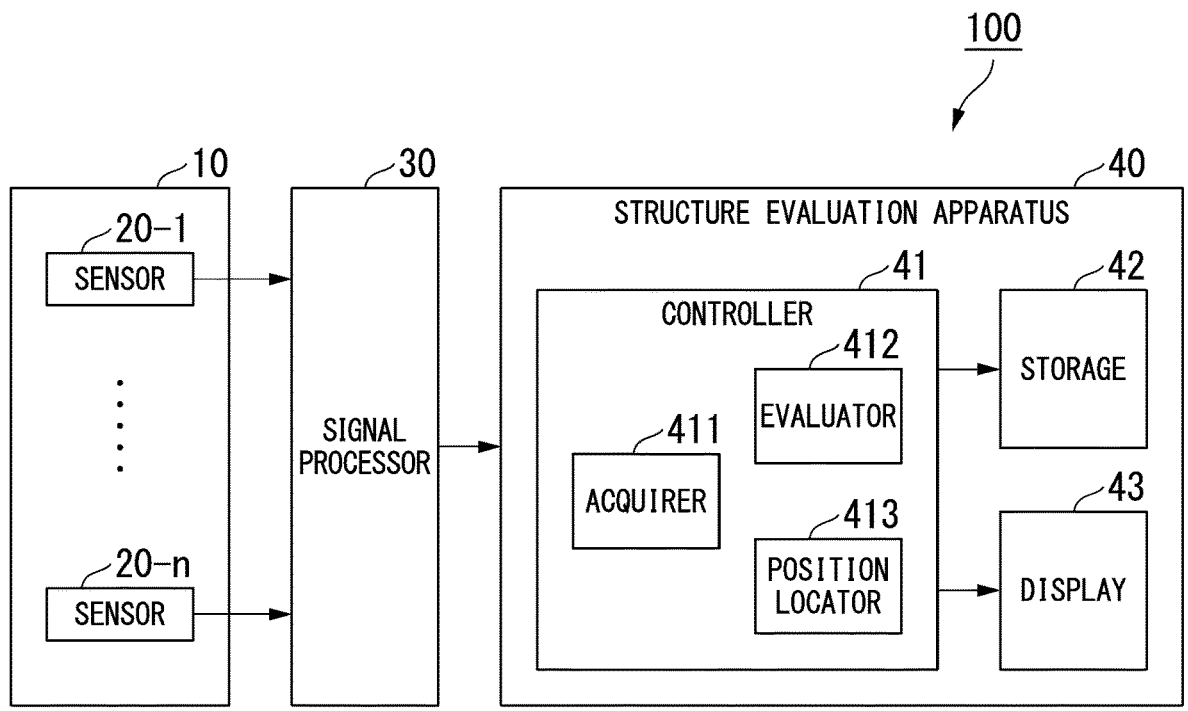
FIG. 3 is a diagram showing a configuration of a structure evaluation system according to a first embodiment.

FIG. 3 is a diagram showing a configuration of a structure evaluation system 100 according to the first embodiment.

The structure evaluation system 100 is used to evaluate the breakage of the PC steel material of the prestressed concrete 10. In the following description, the evaluation means a process of determining the breakage of the PC steel material on the basis of a given criterion.

Hereinafter, a specific configuration of the structure evaluation system 100 will be described.

The structure evaluation system 100 includes a plurality of sensors 20-1 to 20-n (n is an integer of 3 or more), a signal processor 30, and a structure evaluation apparatus 40. The plurality of sensors 20-1 to 20-n and the signal processor 30 are connected by wire so that communication is enabled. The signal processor 30 and the structure evaluation apparatus 40 are connected by wire or wirelessly so that communication is enabled. Also, in the following description, when the sensors 20-1 to 20-$n$ are not distinguished, they will be referred to as sensors 20.

The sensor 20 has a piezoelectric element and detects elastic waves generated from the inside of the prestressed concrete 10. The sensor 20 is installed at a position where elastic waves can be detected. For example, the sensor 20 is installed on any surface among the front surface, the side surface, and the bottom surface of the prestressed concrete 10. The sensor 20 converts the detected elastic waves into an electrical signal. The sensor 20 outputs the electrical signal to the signal processor 30. In the following description, the electrical signal after conversion by the sensor 20 will be referred to as an acoustic emission (AE) signal.

For the sensor 20, for example, a piezoelectric element having sensitivity in a range of 10 kHz to 1 MHz is used. Types of the sensor 20 include a resonance type having a resonance peak within a frequency range, a broadband type in which resonance is limited, and the like, but the sensor 20 may be of any type. Also, methods of the sensor 20 detecting elastic waves include a voltage output type, a resistance change type, a capacitance type, and the like, but any detection method may be used. An acceleration sensor may be used instead of the sensor 20. In this case, the acceleration sensor detects elastic waves that have been generated from the inside of the prestressed concrete 10. The acceleration sensor converts the detected elastic waves into an AE signal which is a voltage signal by performing a process similar to that of the sensor 20. Subsequently, the acceleration sensor outputs the AE signal to the sensor 20.

The signal processor 30 performs signal processing on the AE signal output from the sensor 20. The signal processing which is performed by the signal processor 30 is, for example, noise removal, parameter extraction, and the like. The signal processor 30 generates transmission data including a digital signal after the signal processing and outputs the generated transmission data to the structure evaluation apparatus 40. The signal processor 30 is configured using an analog circuit or a digital circuit. The digital circuit is implemented by, for example, a field programmable gate array (FPGA) and a microcomputer. The digital circuit may be implemented by a dedicated large-scale integration (LSI) circuit. Also, the signal processor 30 may be equipped with a non-volatile memory such as a flash memory or a removable memory.

The structure evaluation apparatus 40 includes a controller 41, a storage 42, and a display 43.

The controller 41 controls the entire structure evaluation apparatus 40. The controller 41 is configured using a processor such as a central processing unit (CPU) and a memory. The controller 41 functions as an acquirer 411, an evaluator 412, and a position locator 413 by executing the program. The program for implementing the acquirer 411, the evaluator 412, and the position locator 413 may be installed in the structure evaluation apparatus 40 at the time of shipment, or may be installed separately.

The acquirer 411 acquires the transmission data output from the signal processor 30. For example, when the signal processor 30 and the structure evaluation apparatus 40 are wirelessly performing communication, the acquirer 411 functions as a communication interface and acquires the transmission data by performing wireless communication with the signal processor 30. For example, when the signal processor 30 and the structure evaluation apparatus 40 are performing communication by wire, the acquirer 411 functions as a communication interface and acquires the transmission data by performing wired communication with the signal processor 30.

The evaluator 412 evaluates the breakage of the steel material on the basis of the transmission data acquired by the acquirer 411. For example, the evaluator 412 evaluates the breakage of the steel material using the information of the elastic waves detected for the second period which is the period after the elapse of the first period from the point in time when the magnitude of the amplitude of the elastic waves is greater than or equal to the threshold value. The above threshold value is a value for detecting a breakage and is set to a value higher than the amplitude of the elastic waves generated due to re-fixation. For example, the threshold value is 70 dB or more. The threshold value may be preset by the user via an operator (not shown). The magnitude of the amplitude compared to the threshold value is, for example, a value of a maximum amplitude. The evaluator 412 may use a counter to determine whether or not the first period has elapsed.

The first period is a period for which it is assumed that there is an influence of the elastic waves generated due to the breakage. The first period is determined by an attenuation time period associated with a size or a type of the prestressed concrete 10. The first period is preset in the structure evaluation apparatus 40. The first period is longer than a plurality of cycles of elastic waves, for example, 7 ms to 9 ms.

The second period is a period in which it is assumed that the influence of elastic waves generated due to the breakage is small. The second period is preset in the structure evaluation apparatus 40. The second period is, for example, 10 ms to 100 s.

The evaluator 412 determines that there is a possibility of a breakage of the steel material when a prescribed number of elastic waves or more have been detected for the second period. That is, the evaluator 412 determines that there is a possibility of a breakage of the steel material when a prescribed number of pieces of transmission data or more have been obtained for the second period. The evaluator 412 determines the breakage of the steel material on the basis of a result of locating a position of at least one elastic wave source in the position locator 413.

The position locator 413 locates the position of the at least one elastic wave source using a plurality of elastic waves detected for the second period by each of the plurality of sensors 20.

The storage 42 stores the transmission data acquired by the acquirer 411. The storage 42 is configured using a storage device such as a magnetic hard disk device or a semiconductor storage device.

The display 43 is an image display device such as a liquid crystal display or an organic electro luminescence (EL) display. The display 43 displays an evaluation result in accordance with control of the controller 41. The display 43 may be an interface for connecting the image display device to the structure evaluation apparatus 40. In this case, the display 43 generates a video signal for displaying an evaluation result and outputs the video signal to the image display device connected to the display 43.

Figure 4:
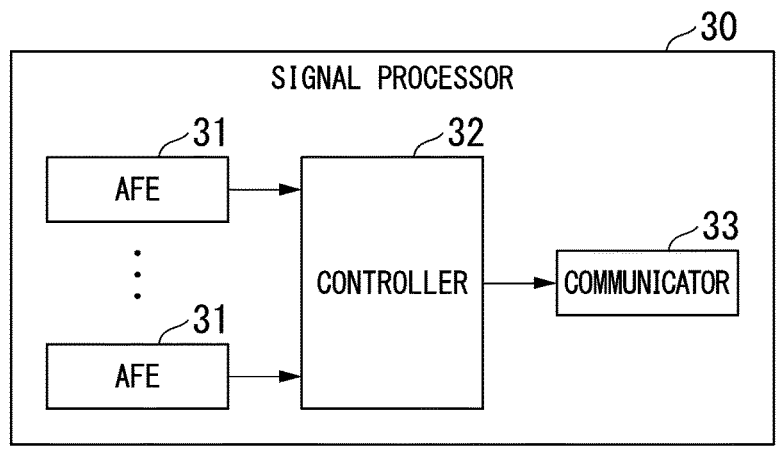
FIG. 4 is a schematic block diagram showing a function of a signal processor according to the first embodiment.

FIG. 4 is a schematic block diagram showing a function of the signal processor 30 according to the first embodiment. The signal processor 30 includes a plurality of analog front ends (AFEs) 31, a controller 32, and a communicator 33.

The AFE 31 performs a filtering process and an analog-to-digital conversion process on the AE signal output from the sensor 20. The AFE 31 outputs a signal after the filtering process and the analog-to-digital conversion process to the controller 32.

The controller 32 controls the entire signal processor 30. The controller 41 is configured using a processor such as a CPU and a memory. For example, the controller 32 generates transmission data on the basis of the signal after the filtering process and the analog-to-digital conversion process output from the AFE 31.

The communicator 33 transmits the transmission data generated by the controller 32 to the structure evaluation apparatus 40.

Figure 5:
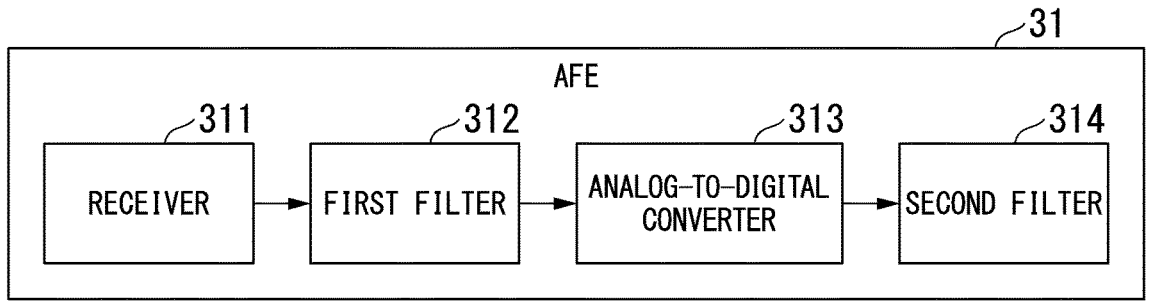
FIG. 5 is a schematic block diagram showing a function of an analog front end (AFE) according to the first embodiment.

FIG. 5 is a schematic block diagram showing a function of the AFE 31 according to the first embodiment. The AFE 31 includes a receiver 311, a first filter 312, an analog-to-digital converter 313, and a second filter 314.

The receiver 311 receives an AE signal transmitted from the sensor 20. The receiver 311 outputs the received AE signal to the first filter 312. It is assumed that time information detected by the sensor 20 is added to the AE signal.

The first filter 312 removes noise from the AE signal received by the receiver 311. For example, the first filter 312 removes a frequency band other than a specific frequency band as noise from the AE signal. The first filter 312 is, for example, a bandpass filter. The first filter 312 outputs an analog signal after noise removal (hereinafter referred to as a "noise-removed analog signal") to the analog-to-digital converter 313.

The analog-to-digital converter 313 converts the analog signal into a digital signal by quantizing the noise-removed analog signal output from the first filter 312. The analog-to-digital converter 313 outputs the digital signal to the second filter 314.

The second filter 314 removes noise from the digital signal output from the analog-to-digital converter 313. The second filter 314 is a filter for removing noise. The second filter 314 outputs a digital signal after noise removal (hereinafter referred to as a "noise-removed digital signal") to the controller 32.

In the following description, the process performed in the AFE 31 will be referred to as preprocessing.

Figure 6:
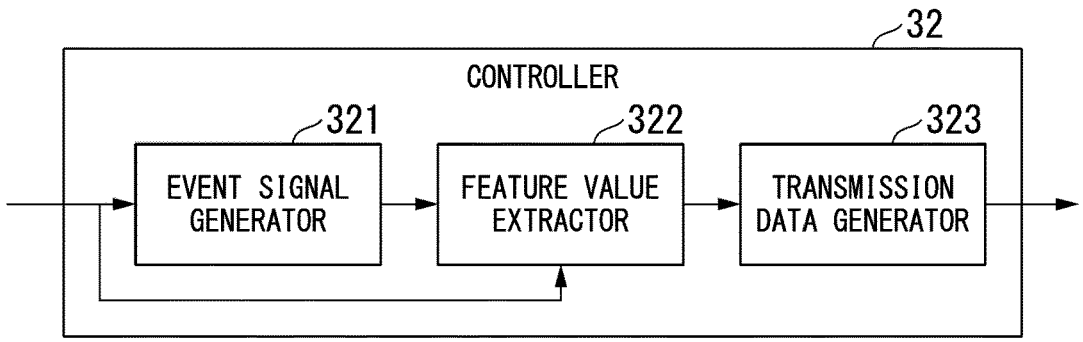
FIG. 6 is a schematic block diagram showing a function of a controller according to the first embodiment.

FIG. 6 is a schematic block diagram showing a function of the controller 32 according to the first embodiment. By executing a program, the controller 32 functions as an event signal generator 321, a feature value extractor 322, and a transmission data generator 323. The program for implementing the event signal generator 321, the feature value extractor 322, and the transmission data generator 323 may be installed in the signal processor 30 at the time of shipment or may be installed separately.

The event signal generator 321 inputs the noise-removed digital signal output from the second filter 314. The event signal generator 321 generates a gate signal indicating whether or not a waveform of the input noise-removed digital signal is sustained. The event signal generator 321 is implemented by, for example, an envelope detector and a comparator. The envelope detector detects an envelope of the noise-removed digital signal. The envelope is extracted, for example, by squaring the noise-removed digital signal and performing a prescribed process (for example, a process using a low-pass filter or a Hilbert transform) on an output value after the noise-removed digital signal is squared. The comparator determines whether or not the envelope of the noise-removed digital signal is greater than or equal to a prescribed threshold value.

When the envelope of the noise-removed digital signal becomes greater than or equal to the prescribed threshold value, the event signal generator 321 outputs a first gate signal indicating that the waveform of the noise-removed digital signal is sustained to the feature value extractor 322.

When the first gate signal has been output, it indicates that an event has occurred. On the other hand, when the envelope of the noise-removed digital signal becomes less than the prescribed threshold value, the event signal generator 321 outputs a second gate signal indicating that the waveform of the noise-removed digital signal is not sustained to the feature value extractor 322. When the second gate signal has been output, it indicates that the event has ended. ChangeFinder, Akaike's information criterion (AIC), or the like may be used to detect the occurrence of an event, i.e., to determine whether or not the envelope is greater than or equal to the prescribed threshold value.

The feature value extractor 322 inputs the gate signal output from the event signal generator 321 and the noise-removed digital signal output from the second filter 314. The feature value extractor 322 extracts a feature quantity when the waveform of the signal continues from the noise-removed digital signal on the basis of the input gate signal and the noise-removed digital signal. Feature quantities include, for example, parameters such as an amplitude [my] of the waveform of the noise-removed digital signal, a rising time period [μsec] of the gate signal, the duration [μsec] of the gate signal, a zero-cross count number [times] of the noise-removed digital signal, the energy [arb.] of the waveform of the noise-removed digital signal, and a frequency [Hz] of the noise-removed digital signal.

The amplitude of the noise-removed digital signal is, for example, a value of a maximum amplitude within the noise-removed digital signal. The rising time period of the gate signal is, for example, a time period until the gate signal rises beyond a preset prescribed value from the zero value. The duration of the gate signal is, for example, a time period until the amplitude becomes smaller than a preset value from the start of rising of the gate signal. The zero-cross count number of the noise-removed digital signal is, for example, the number of times the noise-removed digital signal crosses a reference line passing through the zero value. The energy of the waveform of the noise-removed digital signal is, for example, a value obtained by performing time integration of the square of the amplitude of the waveform at each point in time. The definition of the energy is not limited to the above example and the energy may be approximated using, for example, the envelope of the waveform.

The feature value extractor 322 outputs the extracted feature quantity to the transmission data generator 323. When the feature value extractor 322 outputs the feature quantity to the transmission data generator 323, the feature quantity is associated with a sensor ID. The sensor ID indicates identification information for identifying the sensor 20 installed on the prestressed concrete 10. The feature value extractor 322 outputs the feature quantity associated with the sensor ID to the transmission data generator 323.

The transmission data generator 323 receives the feature quantity associated with the sensor ID output from the feature value extractor 322 as an input. The transmission data generator 323 generates transmission data including the feature quantity associated with the input sensor ID. The transmission data generator 323 outputs the generated transmission data to the communicator 33.

Figure 7:
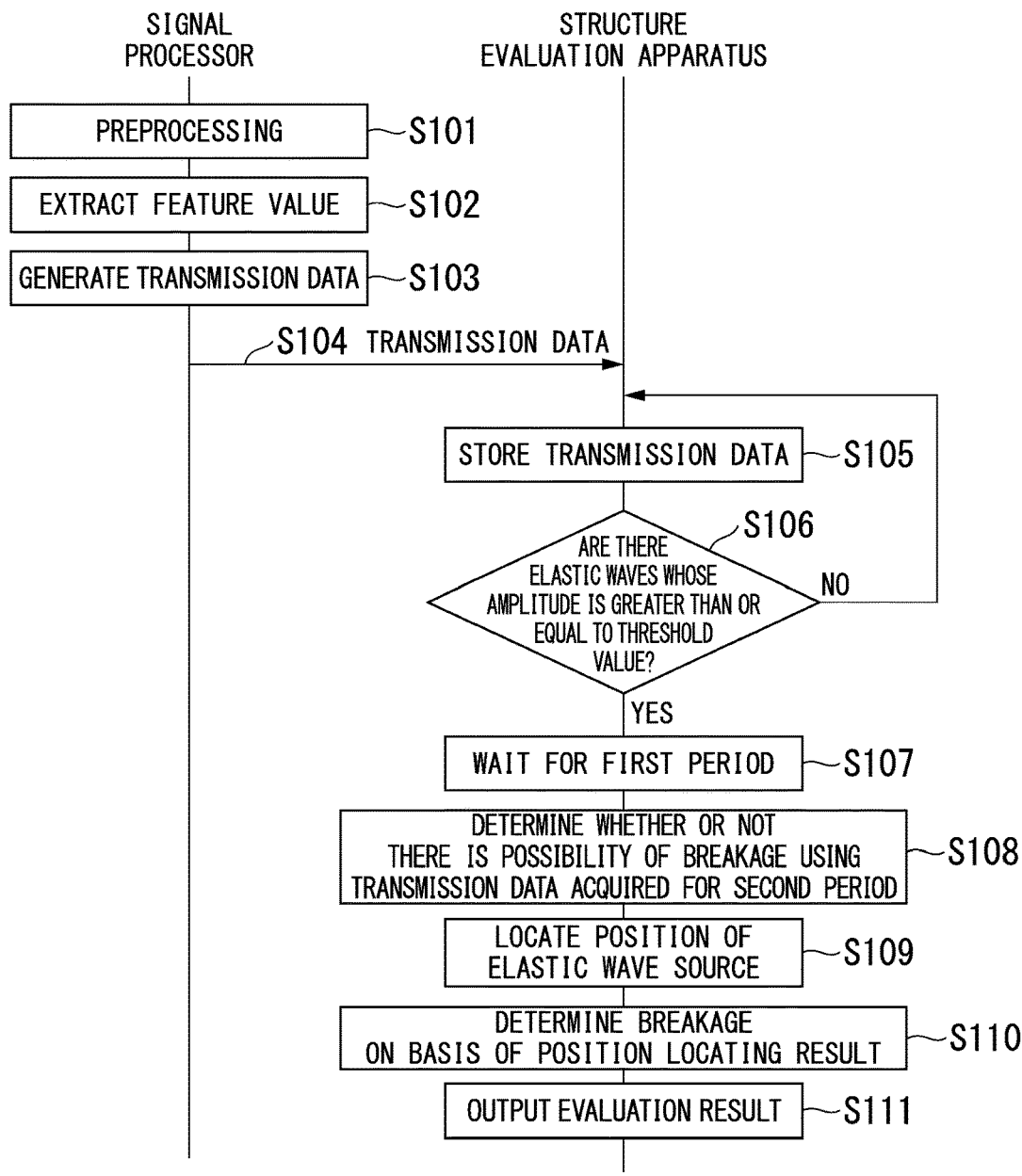
FIG. 7 is a sequence diagram showing a flow of a steel material breakage evaluation process of the structure evaluation system according to the first embodiment.

FIG. 7 is a sequence diagram showing a flow of a steel material breakage evaluation process of the structure evaluation system 100 according to the first embodiment.

The AFE 31 performs preprocessing on an AE signal transmitted from the sensor 20 (step S101). Specifically, the AFE 31 performs a filtering process and an analog-to-digital conversion process on the AE signal. The AFE 31 outputs a noise-removed digital signal to the controller 32. The controller 32 receives the noise-removed digital signal output from the AFE 31 as an input and extracts a feature quantity from the noise-removed digital signal (step S102). Here, the feature value extractor 322 extracts the feature quantity from the noise-removed digital signal only when the first gate signal is output by the event signal generator 321. On the other hand, the feature value extractor 322 does not extract the feature quantity from the noise-removed digital signal when the second gate signal is output by the event signal generator 321.

The feature value extractor 322 associates the extracted feature quantity with a sensor ID and outputs the extracted feature quantity associated with the sensor ID to the transmission data generator 323. The transmission data generator 323 generates transmission data including the feature quantity output from the feature value extractor 322 (step S103). The transmission data includes time information of a point in time when the feature quantity, the sensor ID, and the AE signal have been detected by the sensor 20. The transmission data generator 323 outputs the generated transmission data to the communicator 33. The communicator 33 transmits the transmission data output from the transmission data generator 323 to the structure evaluation apparatus 40 (step S104). Every time the signal processor 30 generates transmission data, the transmission data is transmitted from the signal processor 30 to the structure evaluation apparatus 40.

The acquirer 411 acquires the transmission data transmitted from the signal processor 30. The acquirer 411 stores the acquired transmission data in the storage 42 (step S105). The evaluator 412 determines whether or not elastic waves whose amplitude is greater than or equal to a threshold value (for example, 70 dB or more) have been detected with reference to the transmission data stored in the storage 42 at a prescribed timing (step S106). The prescribed tuning may be, for example, a timing at which the transmission data has been acquired by the acquirer 411, a timing at which a prescribed number of pieces of transmission data have been stored in the storage 42, or a timing at which a preset point in time has been reached.

Specifically, first, the evaluator 412 acquires transmission data unused for determination from the transmission data stored in the storage 42. Subsequently, the evaluator 412 determines whether or not there is transmission data whose amplitude value is greater than or equal to the threshold value from the acquired transmission data. When there is transmission data whose amplitude value is greater than or equal to the threshold value, the evaluator 412 determines that elastic waves whose amplitude is greater than or equal to the threshold value have been detected. On the other hand, when there is no transmission data whose amplitude value is greater than or equal to the threshold value, the evaluator 412 determines that elastic waves whose amplitude is greater than or equal to the threshold value have not been detected.

When elastic waves whose amplitude is greater than or equal to the threshold value have not been detected (step S106—NO), the evaluator 412 waits until elastic waves whose amplitude is greater than or equal to the threshold value are detected.

When elastic waves whose amplitude is greater than or equal to the threshold value have been detected (step S106—YES), the evaluator 412 waits without performing a first period process (step S107). Transmission data may be transmitted from the signal processor 30 even if a waiting state is for the first period. In this case, the acquirer 411 stores the transmission data transmitted from the signal processor 30 in the storage 42 in time-series order.

When the first period has elapsed, the evaluator 412 determines whether or not there is a possibility of a breakage of the PC steel material using the transmission data acquired for the second period (step S108). Specifically, the evaluator 412 determines that there is a possibility of a breakage of the PC steel material when a prescribed number of pieces of transmission data or more have been acquired for the second period. The fact that a prescribed number of pieces of transmission data or more have been acquired for the second period means that a prescribed number of elastic waves or more have been detected by the sensor 20 for the second period. There is a high possibility of the generation of elastic waves due to re-fixation and the detection of the elastic waves by the sensor 20. Thus, the evaluator 412 determines that there is a possibility of a breakage of the PC steel material when a prescribed number of pieces of transmission data or more have been acquired for the second period. In this case, the evaluator 412 causes the position locator 413 to locate a position of an elastic wave source. For example, the evaluator 412 outputs the transmission data acquired for the second period to the position locator 413 and issues an instruction for locating the position of the elastic wave source.

The position locator 413 locates the position of the elastic wave source using a plurality of pieces of transmission data acquired for the second period in accordance with the instruction from the evaluator 412 (step S109). At this time, the position locator 413 locates the position of the elastic wave source using the transmission data of the same event, which is transmission data related to elastic waves detected by the different sensors 20 among the plurality of pieces of transmission data acquired for the second period. The position locator 413 outputs a position locating result to the evaluator 412. The evaluator 412 determines the breakage of the PC steel material on the basis of the position locating result output from the position locator 413 (step S110). Specifically, first, the evaluator 412 segments a structure serving as an evaluation target into areas each having a prescribed size. A size of the segment area is preset. Hereinafter, each area after the segmentation will be referred to as a segment area. Subsequently, the evaluator 412 measures the number of elastic wave sources indicated in the position locating result output from the position locator 413 for each segment area. The evaluator 412 determines that the PC steel material has breakage when there is a segment area where the number of elastic wave sources is greater than or equal to a threshold value among the plurality of segment areas. On the other hand, the evaluator 412 determines that the PC steel material has not breakage when there is no segment area where the number of elastic wave sources is greater than or equal to the threshold value among the plurality of segment areas.

The evaluator 412 outputs an evaluation result (step S111). The evaluation result includes information indicating the presence or absence of a breakage of the PC steel material and a result of locating a position of an elastic wave source. Specifically, the evaluator 412 controls the display 43 so that the evaluation result is displayed. The display 43 displays the evaluation result in accordance with control of the evaluator 412.

Figure 8:
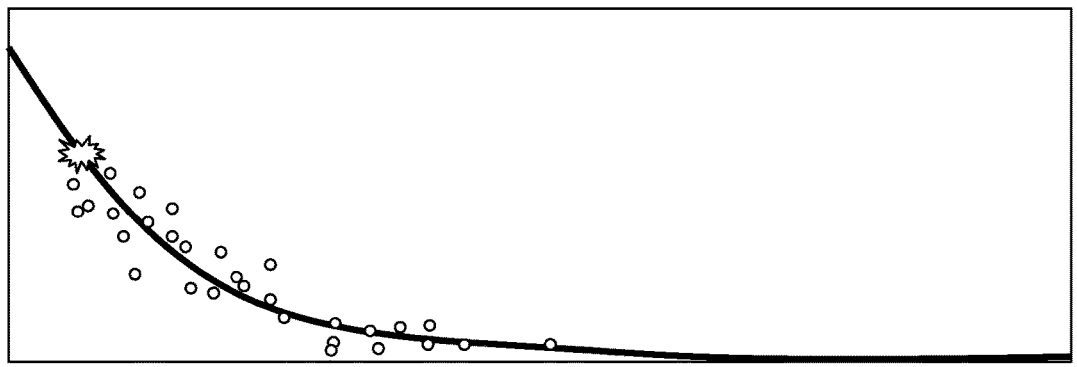
FIG. 8 is a diagram for describing a located position of elastic waves detected after a breakage of a PC steel material according to the first embodiment.
Figure 9:
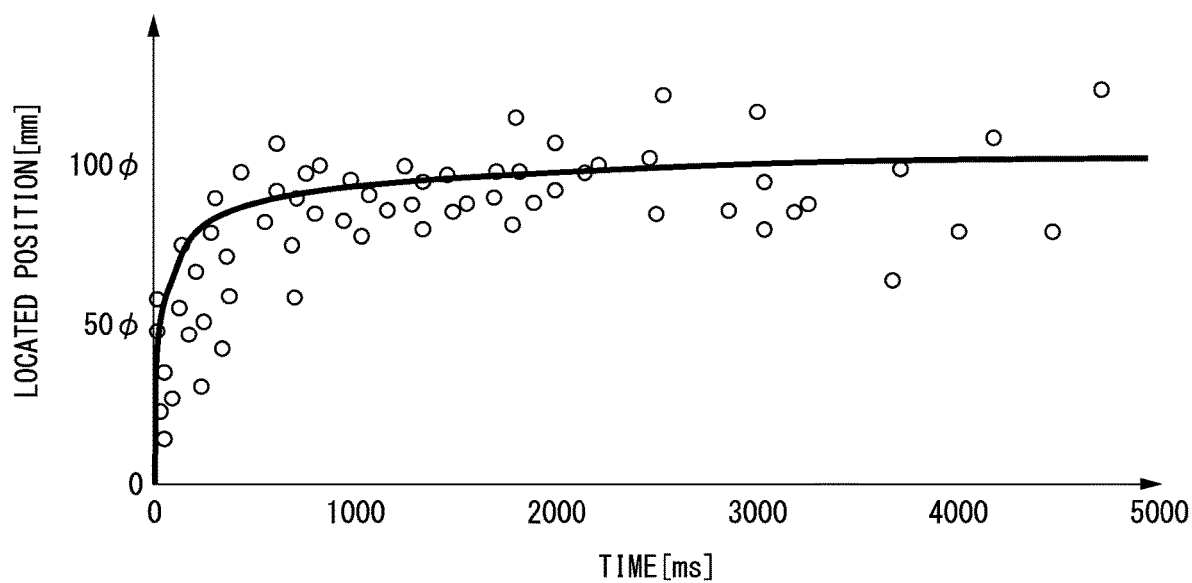
FIG. 9 is a diagram for describing a located position of elastic waves detected after a breakage of a PC steel material according to the first embodiment.

FIGS. 8 and 9 are diagrams for describing a located position of elastic waves detected after the breakage of the PC steel material. In FIG. 8, a located position of elastic waves detected after the breakage of the PC steel material is shown. When the position of the steel material is known, a breakage can be determined if there is a distribution at the position. Alternatively, when the position of the steel material is not known, a breakage can be determined under an assumption that the steel material is at a position if the position is located and the steel material is concentrated at the located position. As shown in FIG. 9, re-fixation occurs after the breakage of the PC steel material and a range of elastic waves of the re-fixation starts from a breakage area and finally converges to a certain value. Also, as shown in FIG. 9, the above elastic wave range varies from 60ϕ to 100ϕ depending on the member of the prestressed concrete 10 or the like.

Figure 10:
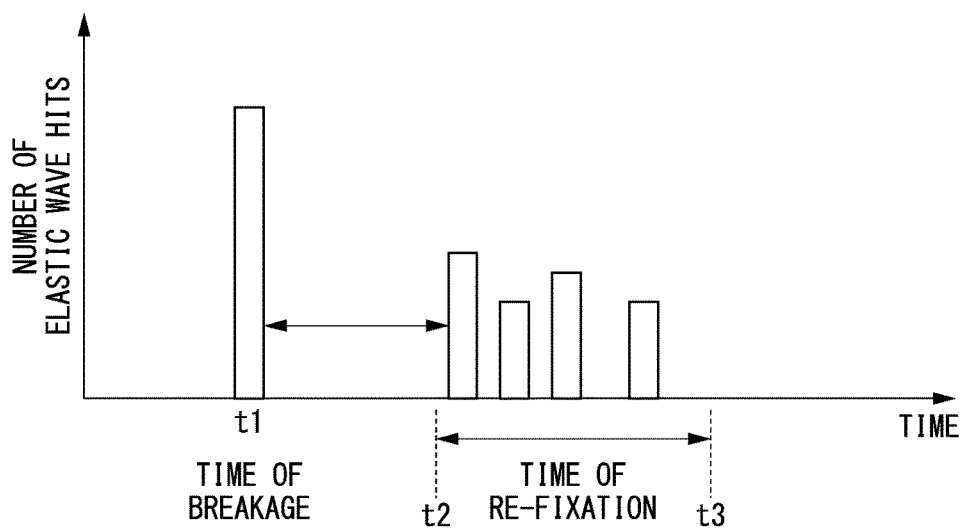
FIG. 10 is a diagram for describing a relationship between elastic waves generated due to a breakage and elastic waves generated due to re-fixation according to the first embodiment.
Figure 11:
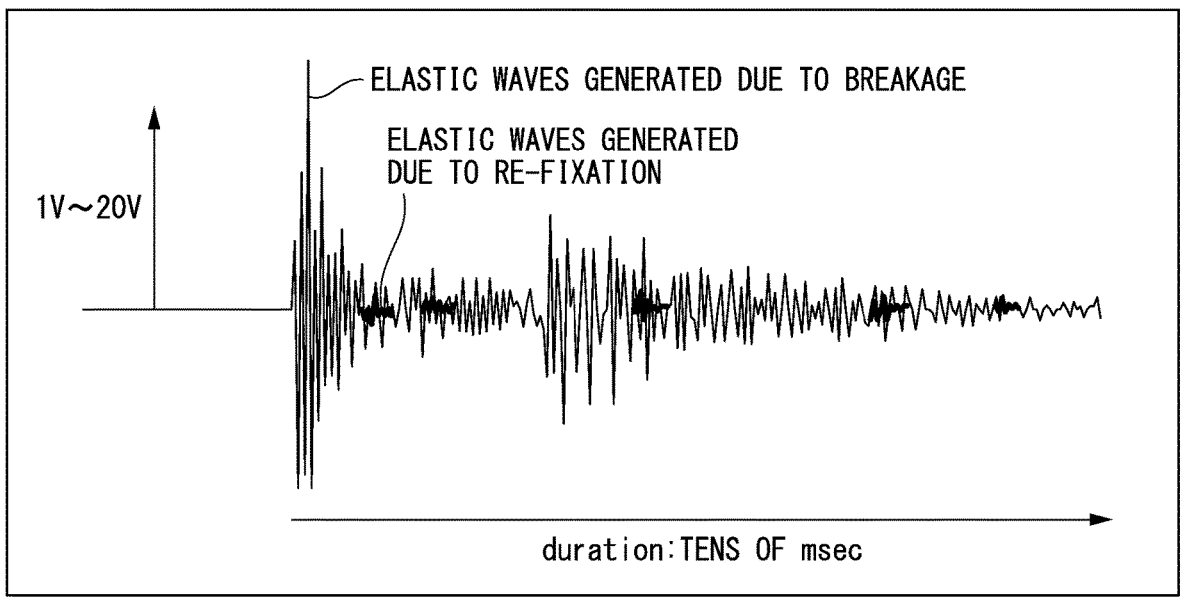
FIG. 11 is a diagram for describing a relationship between elastic waves generated due to a breakage and elastic waves generated due to re-fixation according to the first embodiment.

FIGS. 10 and 11 are diagrams for describing a relationship between elastic waves generated due to the breakage and elastic waves generated due to the re-fixation. As experiment results, it has been found that the elastic waves cannot be detected for a certain period after time t1 at which the breakage has occurred (between times t1 and t2 in FIG. 10) as shown in FIG. 10. It is considered that this is because, as shown in FIG. 11, the impact when the PC steel material inside the prestressed concrete 10 breakage is large and the elastic waves generated due to the re-fixation are hidden by the impact at the time of the breakage.

Figure 12A:
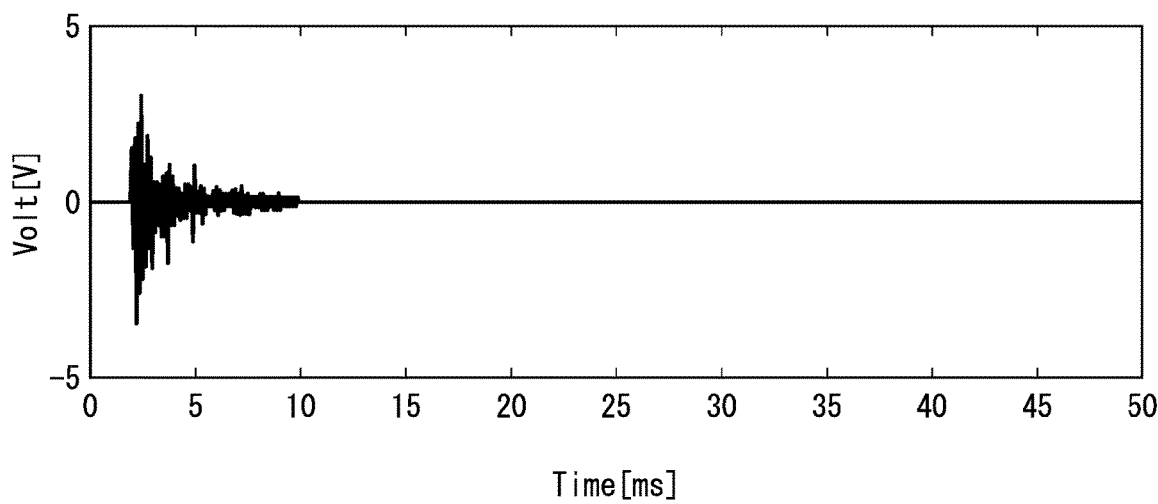
FIG. 12A is a diagram showing an example of a process start timepoint determination process of an evaluator according to the first embodiment.
Figure 12B:
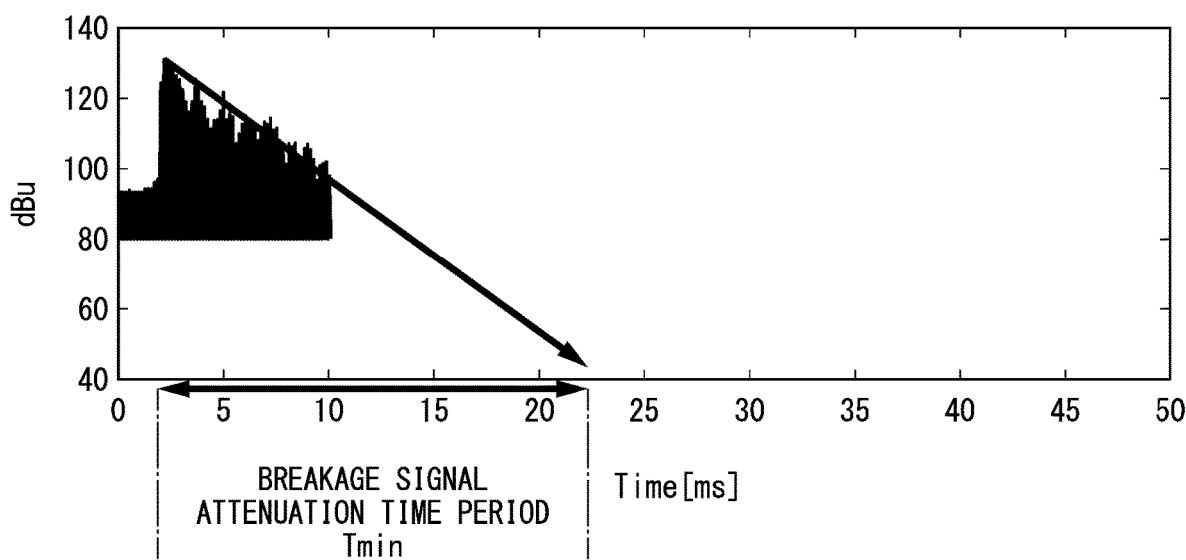
FIG. 12B is a diagram showing an example of a process start timepoint determination process of the evaluator according to the first embodiment.
Figure 13:
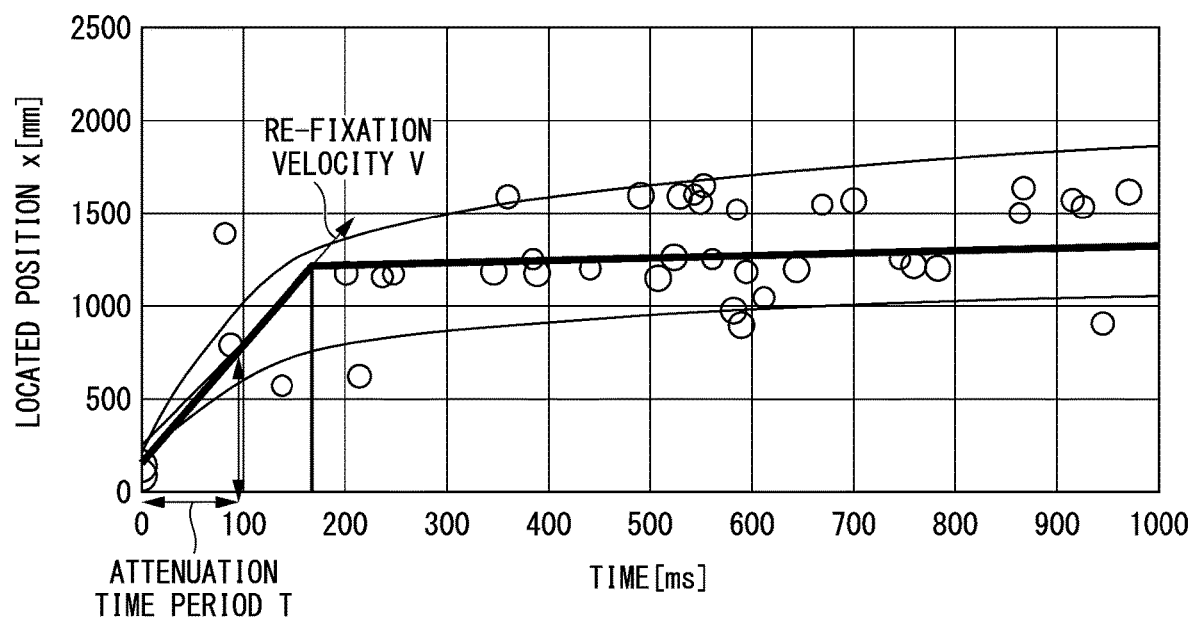
FIG. 13 is a diagram showing an example of a process start timepoint determination process of the evaluator according to the first embodiment.
Figure 14:
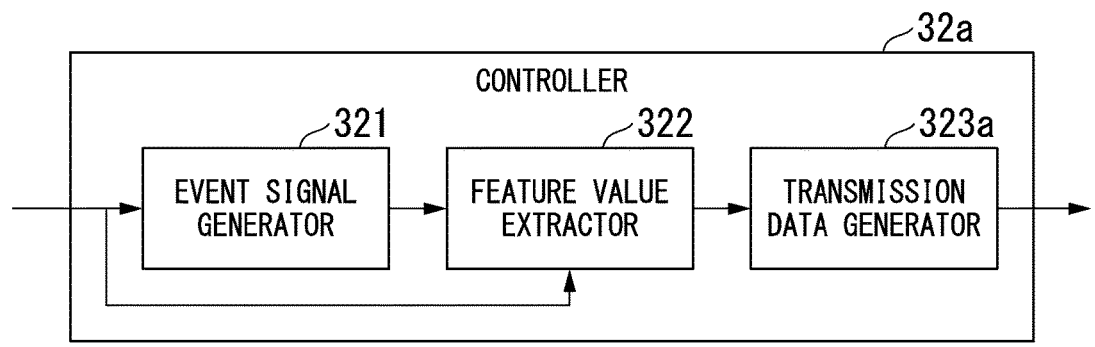
FIG. 14 is a schematic block diagram showing a function of a controller according to a second embodiment.

FIGS. 12A, 12B, and 13 are diagrams showing an example of a process start timepoint determination process of the evaluator 412. As experiment results, it has been found that the elastic waves at the time of the breakage decrease linearly on the log scale with time as shown in FIG. 12B. Thus, if the required sensitivity is determined, the attenuation time is determined. Although there are variations depending on the material of the prestressed concrete 10 and the sensor 20, there is a slope of 5 dB/ms in the example shown in FIG. 12B. For example, when the sensor sensitivity is 40 dBu or more and when elastic waves having a strength of 1 V are generated at the time of the breakage, no process may be performed because it is difficult to detect elastic waves generated due to re-fixation for at least 16 ms. A period for which no process may be performed is the first period. The second period is after the end of the first period for which elastic waves become detectable. Alternatively, as shown in FIG. 13, because a time period for which a range of elastic waves generated due to re-fixation starts from the breakage area and finally converges to a certain value is 160 ms, it is possible to detect elastic waves generated due to re-fixation after 160 ms. A period for which elastic waves generated due to the above re-fixation can be detected is also the second period. Although it is desirable that the elastic wave detection be started after the elapse of 16 ms from the time of the breakage according to the results shown in FIG. 13, evaluation is enabled until re-fixation ends from a timing of 160 ms when the elastic waves converge to a certain position and evaluation is also enabled at a timing of 10 s when a sufficient number of points can be ensured for the evaluation. That is, the second period may be after the first period or after the re-fixation position converges. Also, 160 ms and 10 s shown here are merely examples and a change is made depending on the material of the prestressed concrete 10 and the sensor 20 as described above.

According to the first embodiment configured as described above, the structure evaluation system 100 includes the plurality of sensors 20 configured to detect elastic waves generated in the prestressed concrete 10; and the evaluator 412 configured to evaluate a breakage of the steel material using elastic waves detected for the second period which is the period after the elapse of the first period from the point in time when the magnitude of the amplitude of the elastic waves detected by the plurality of sensors 20 is greater than or equal to the threshold value. The evaluator 412 waits for the first period process under an assumption that the breakage of the PC steel material or large noise has occurred when there is transmission data in which the magnitude of the amplitude of the elastic waves is greater than or equal to the threshold value. The evaluator 412 evaluates the breakage of the PC steel material using the transmission data obtained for the second period after the elapse of the first period. Thereby, the breakage is not evaluated for a period when it is assumed that there is an influence of the elastic waves generated due to the breakage. The breakage of the PC steel material can be evaluated using the transmission data obtained for the second period when it is assumed that the influence of the elastic waves generated due to the breakage is reduced. By reducing the influence of elastic waves generated due to the breakage as described above, it is easier to detect elastic waves generated due to re-fixation. As a result, it can be determined that the elastic waves of the threshold value or more are not the noise but are the elastic waves generated due to the breakage. Thus, it is possible to evaluate the breakage of the steel material of the prestressed concrete accurately.

Hereinafter, a modified example of the first embodiment will be described.

The evaluator 412 may determine a breakage area of a PC steel material on the basis of a position locating result. Specifically, the evaluator 412 determines that a segment area where the number of elastic wave sources is greater than or equal to a threshold value is the breakage area of the PC steel material. In the case of the configuration as described above, the evaluator 412 controls the display 43 so that the display 43 is allowed to display an evaluation result and a breakage area. The display 43 may display the evaluation result and the breakage area separately, or may display the evaluation result and the breakage area on the same screen. When image data of the prestressed concrete 10 is saved in the structure evaluation apparatus 40, the display 43 may be allowed to display the breakage area superimposed on screen data of the prestressed concrete 10.

In the case of the configuration as described above, the position locator 413 locates a position of an elastic wave source using a plurality of pieces of transmission data obtained for the second period. The evaluator 412 determines a breakage area as well as a breakage of the PC steel material. The evaluator 412 causes the display 43 to display the evaluation result and the breakage area. Thereby, it is possible to roughly find out at which position of the PC steel material in the prestressed concrete 10 the breakage has occurred. Thus, the user does not need to check the entire prestressed concrete 10 at the time of inspection, and the burden at the time of inspection can be reduced.

The evaluator 412 may determine that breakage of the PC steel material has occurred when a prescribed number of pieces of transmission data or more have been acquired for the second period. In the case of the configuration as described above, the structure evaluation apparatus 40 operates as follows. When the evaluator 412 determines that breakage of the PC steel material has occurred, the position locator 413 locates a position of the elastic wave source using a plurality of pieces of transmission data acquired for the second period. The evaluator 412 determines a breakage area of the PC steel material in a method similar to a method shown in the embodiment using the position locating result of the position locator 413.

In the case of the configuration as described above, although the accuracy is lowered, the breakage of the steel material can be evaluated in a procedure which is simpler than that of the method shown in the embodiment. Thus, the processing load can be reduced.

Second Embodiment

In a second embodiment, a signal processor 30 determines a threshold value, and the signal processor 30 transmits only transmission data to be processed by the structure evaluation apparatus 40 to the structure evaluation apparatus 40. Hereinafter, only differences from the first embodiment will be described.

Hg. 14 is a schematic block diagram showing a function of a controller 32a according to the second embodiment. The controller 32a is configured using a processor such as a CPU and a memory. By executing a program, the controller 32a functions as an event signal generator 321, a feature value extractor 322, and a transmission data generator 323a. The controller 32a is different from the controller 32 in that the transmission data generator 323a is included in place of the transmission data generator 323. The controller 32a is similar to the controller 32 in the other configuration. Thus, the description of the entire controller 32a will be omitted and the transmission data generator 323a will be described.

The transmission data generator 323a receives a feature quantity associated with a sensor ID output from the feature value extractor 322 as an input. The transmission data generator 323a generates transmission data including the feature quantity associated with the sensor ID that has been input. The transmission data generator 323a determines whether or not the transmission condition is satisfied when the transmission data is generated. The transmission condition is a condition for generating transmission data. The transmission condition is that there is an AE signal of elastic waves detected for a second period after the AE signal whose amplitude is greater than or equal to a threshold value is detected. When the transmission condition is satisfied, the transmission data generator 323a generates transmission data including a feature quantity obtained from the AE signal that satisfies the transmission condition. The transmission data generator 323 outputs the generated transmission data to the communicator 33. All the transmission data including the feature quantity obtained from the AE signal satisfying the transmission condition includes information about the elastic waves detected for the second period.

Figure 15:
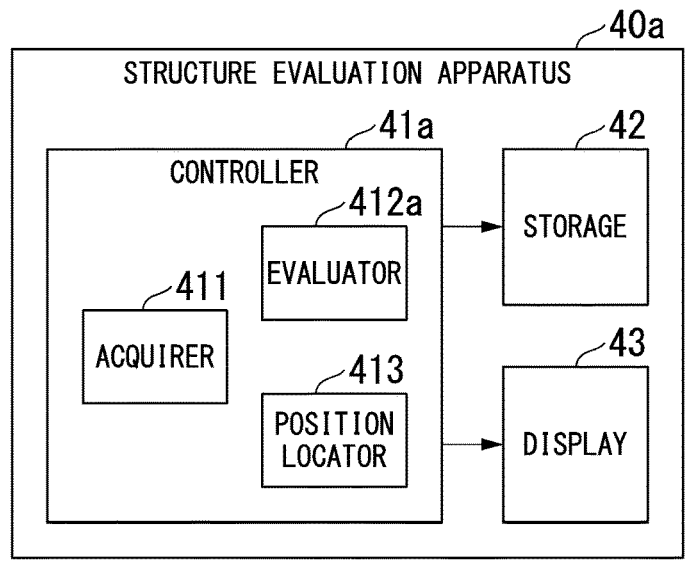
FIG. 15 is a schematic block diagram showing a function of a structure evaluation apparatus according to the second embodiment.

FIG. 15 is a schematic block diagram showing a function of the structure evaluation apparatus 40a according to the second embodiment. The structure evaluation apparatus 40a includes a controller 41a, a storage 42, and a display 43.

The controller 41a controls the entire structure evaluation apparatus 40a. The controller 41a is configured using a processor such as a CPU and a memory. The controller 41a functions as an acquirer 411, an evaluator 412a, and a position locator 413 by executing the program. The controller 41a is different from the controller 41 in that the evaluator 412a is included in place of the evaluator 412. The controller 41a is similar to the controller 41 in the other configuration. Thus, the description of the entire controller 41a will be omitted and the evaluator 412a will be described.

The evaluator 412a evaluates a breakage of a steel material on the basis of transmission data acquired by the acquirer 411. In the second embodiment, the transmission data acquired by the acquirer 411 is transmission data related to elastic waves detected for the second period. Thus, the evaluator 412a may not perform the determination of whether or not the magnitude of the amplitude of the elastic waves is greater than or equal to the threshold value and the waiting for the first period using the transmission data acquired by the acquirer 411. Using the transmission data acquired by the acquirer 411, the evaluator 412a determines that there is a possibility of a breakage of the steel material when a prescribed number of elastic waves or more have been detected. The evaluator 412a determines the breakage of the steel material on the basis of a result of locating a position of an elastic wave source in the position locator 413.

Figure 16:
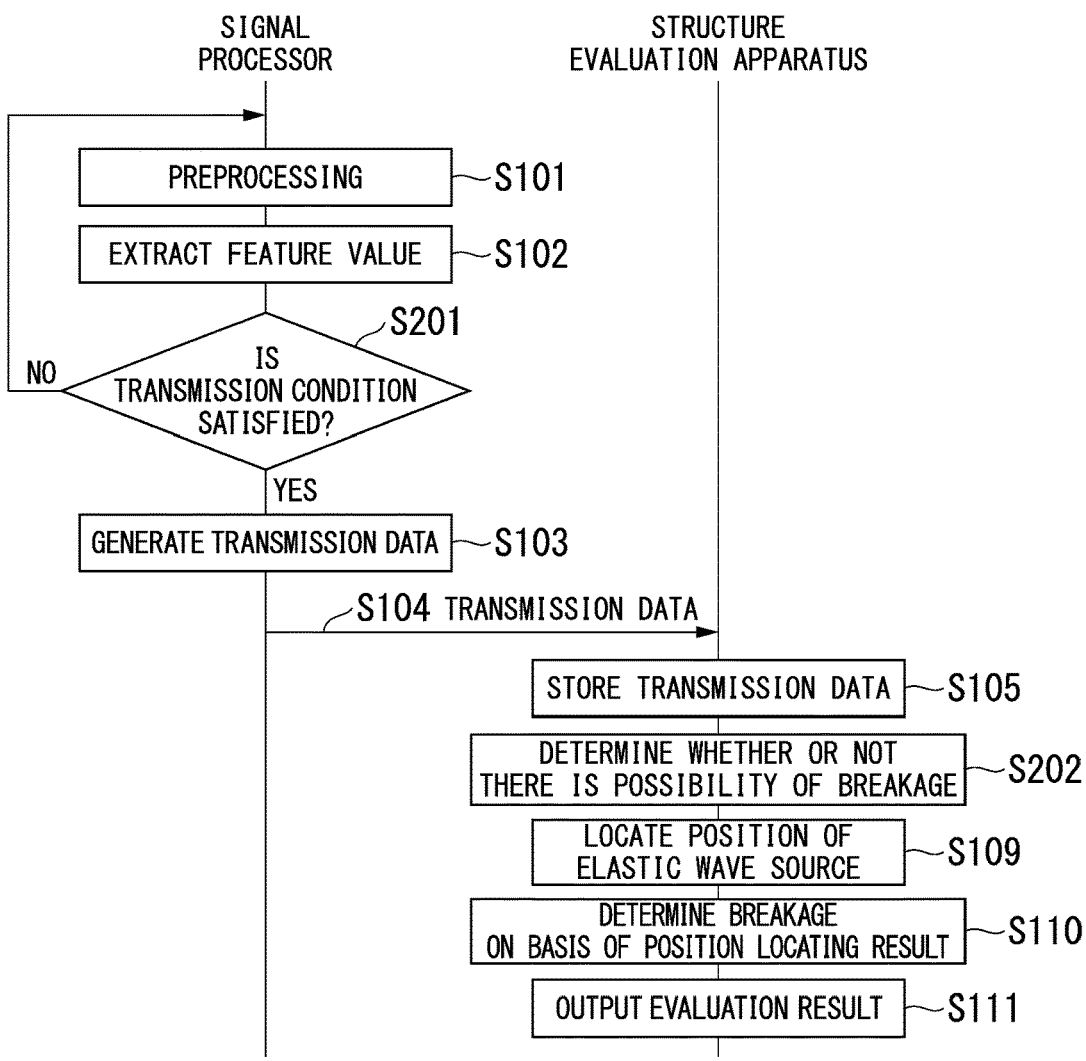
FIG. 16 is a sequence diagram showing a flow of a steel material breakage evaluation process of the structure evaluation system according to the second embodiment.

FIG. 16 is a sequence diagram showing a flow of a steel material breakage evaluation process of the structure evaluation system 100 in the second embodiment. In FIG. 15, processing steps similar to those in FIG. 7 are denoted by reference signs similar to those in FIG. 7 and the description thereof will be omitted.

The transmission data generator 323a determines whether or not a transmission condition is satisfied (step S201). When the transmission condition is not satisfied (step S201—NO), the transmission data generator 323a does not generate transmission data before the transmission condition is satisfied.

On the other hand, when the transmission condition is satisfied (step S201—YES), the transmission data generator 323a generates transmission data. Subsequently, the generated transmission data is transmitted to the structure evaluation apparatus 40a via the communicator 33.

In the structure evaluation apparatus 40a, the evaluator 412 determines whether or not there is a possibility of a breakage of the PC steel material using the transmission data acquired by the acquirer 411 (step S202). Specifically, the evaluator 412a determines that there is a possibility of a breakage of the PC steel material when a prescribed number of pieces of transmission data or more have been acquired by the acquirer 411. Subsequently, the processing from step S109 is executed as in the first embodiment.

According to the structure evaluation system 100 in the second embodiment configured as described above, the signal processor 30a transmits only transmission data necessary for evaluation to the structure evaluation apparatus 40a. Thereby, the structure evaluation apparatus 40a does not need to acquire information of all elastic waves acquired by the signal processor 30a. Thus, the processing load of the structure evaluation apparatus 40a can be reduced. Further, because the structure evaluation apparatus 40a evaluates the breakage of the PC steel material using the transmission data that has been obtained, the evaluation can be easily performed. Thus, it is possible to evaluate the breakage of the steel material included in the prestressed concrete accurately. Hereinafter, a modified example of the second embodiment will be described.

Similar to the evaluator 412 shown in the first embodiment, the evaluator 412a may determine a breakage area of the PC steel material on the basis of a position locating result.

Similar to the evaluator 412, the evaluator 412a may determine that breakage of the PC steel material has occurred when a prescribed number of pieces of transmission data or more have been acquired for the second period.

Third Embodiment

In the first embodiment and the second embodiment, because it is not known when a breakage will occur, it is necessary to keep a signal processor in an operable state all the time. Thus, power consumption increases. Therefore, in a third embodiment, an operation control device that is simpler than the signal processor and consumes less power is installed on prestressed concrete and a signal processor is operated only when an operation is required.

Figure 17:
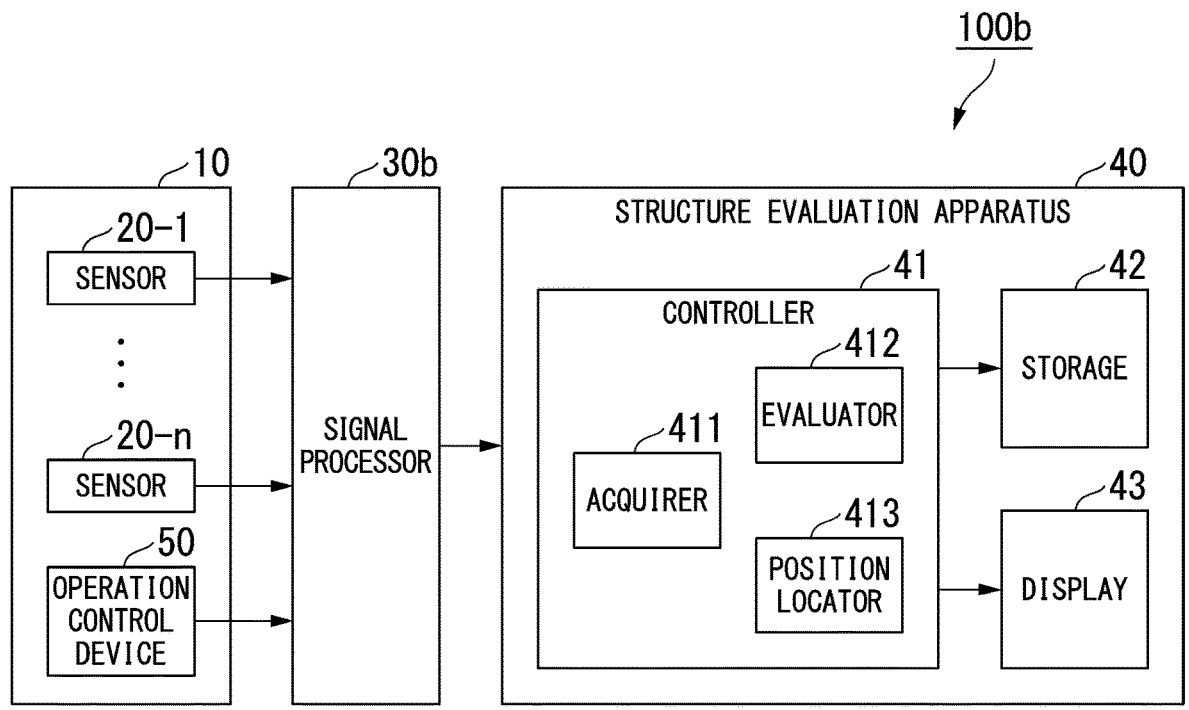
FIG. 17 is a diagram showing a configuration of a structure evaluation system according to a third embodiment.

FIG. 17 is a diagram showing a configuration of a structure evaluation system 100b according to the third embodiment.

The structure evaluation system 100b includes a plurality of sensors 20-1 to 20-n, a signal processor 30b, a structure evaluation apparatus 40, and an operation control device 50. The plurality of sensors 20-1 to 20-n and the signal processor 30b are connected by wire so that communication is enabled. The signal processor 30b and the structure evaluation apparatus 40 are connected by wire or wirelessly so that communication is enabled. The signal processor 30b and the operation control device 50 are connected by wire so that communication is enabled.

The operation control device 50 is installed on a surface of prestressed concrete 10 like the sensor 20. The operation control device 50 includes a sensor similar to the sensor 20 and detects elastic waves generated from the inside of the prestressed concrete 10. When a magnitude of an amplitude of the detected elastic waves is greater than or equal to a threshold value, the operation control device 50 outputs an operation signal for putting the signal processor 30b in an operating state to the signal processor 30b. Putting the signal processor 30b in the operating state means a process of causing the signal processor 30b to perform signal processing. That is, in the third embodiment, the signal processor 30b does not perform signal processing on the elastic waves before the operation signal is acquired from the operation control device 50.

The signal processor 30b transitions to the operating state on the basis of the operation signal output from the operation control device 50. The signal processor 30b is in a dormant state until it transitions to the operating state. The dormant state is a state in which the signal processor 30b is dormant. The dormant state is a state in which power consumption is lower than that in the operating state. The dormant state may be, for example, a state in which signal processing is not performed even if activation is performed, a sleep state, or a stopped state in which a power supply is turned off.

Figure 18:
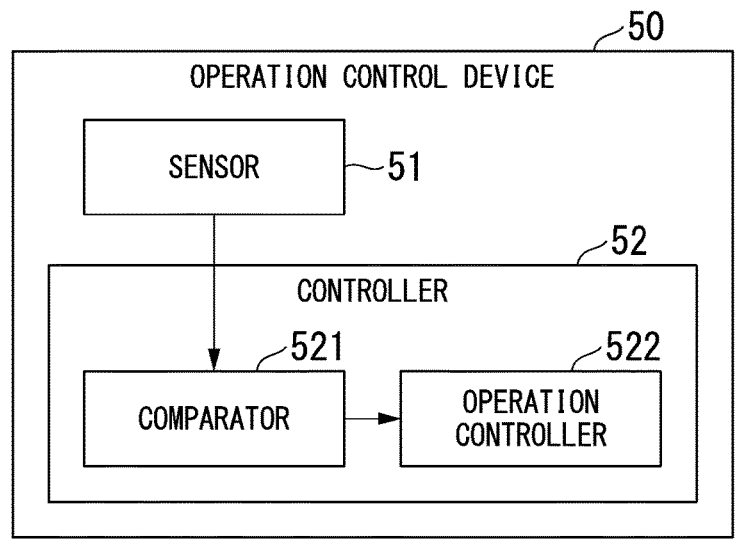
FIG. 18 is a schematic block diagram showing a function of an operation control device according to the third embodiment.

FIG. 18 is a schematic block diagram showing a function of the operation control device 50 according to the third embodiment. The operation control device 50 includes a sensor 51 and a controller 52.

The sensor 51 has a piezoelectric element and detects elastic waves generated from the inside of the prestressed concrete 10. The sensor 51 is installed at a position where elastic waves can be detected. For example, the sensor 51 is installed on any surface among a front surface, a side surface, and a back surface of the prestressed concrete 10. The sensor 51 converts the detected elastic waves into an electrical signal. The sensor 51 outputs the electrical signal to the controller 52.

The controller 52 controls the entire operation control device 50. The controller 52 is configured using a processor such as a CPU and a memory. The controller 52 functions as a comparator 521 and an operation controller 522 by executing the program. The program for implementing the comparator 521 and the operation controller 522 may be installed in the operation control device 50 at the time of shipment or may be installed separately.

The comparator 521 compares an amplitude of elastic waves detected by the sensor 51 with a threshold value. The comparator 521 notifies the operation controller 522 that the signal processor 30b needs to be operated when the magnitude of the amplitude of the elastic waves is greater than or equal to the threshold value. On the other hand, when the magnitude of the amplitude of the elastic waves is less than the threshold value, the comparator 521 stands by as it is.

The operation controller 522 controls an operation of the signal processor 30b on the basis of a comparison result of the comparator 521. Specifically, the operation controller 522 generates an operation signal when the comparator 521 notifies that the signal processor 30b needs to be operated. The operation controller 522 outputs the generated operation signal to the signal processor 30b.

Figure 19:
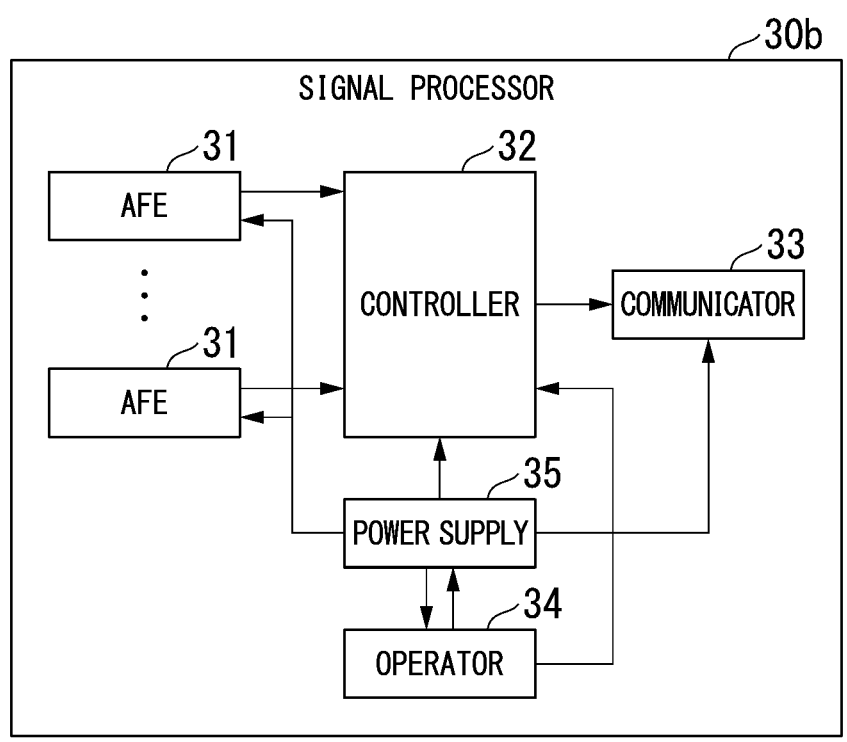
FIG. 19 is a schematic block diagram showing a function of a signal processor according to the third embodiment.

FIG. 19 is a schematic block diagram showing a function of the signal processor 30b according to the third embodiment. The signal processor 30b includes a plurality of AFEs 31, a controller 32, a communicator 33, an operator 34, and a power supply 35. The signal processor 30b is different from the signal processors 30 and 30a in that the operator 34 and the power supply 35 are newly provided. The other configuration of the signal processor 30b is similar to that of the signal processor 30 or 30a. Thus, the description of the entire signal processor 30b will be omitted and the operator 34 and the power supply 35 will be described.

When the operator 34 acquires an operation signal from the operation control device 50, the operator 34 puts the controller 32 and the power supply 35 in the operating state. For example, when the controller 32 is in the sleep state, the operator 34 puts the controller 32 in the operating state so that signal processing is possible in the controller 32. For example, when the controller 32 is in the stopped state, the operator 34 puts the controller 32 in the operating state by supplying electric power from the power supply 35 to the controller 32. Likewise, even if either the AFE 31 or the communicator 33 is not powered on, the operator 34 instructs the power supply 35 to supply electric power to a functional unit that is not powered on.

The power supply 35 supplies electric power to each functional unit in accordance with the instruction of the operator 34. Specifically, the power supply 35 supplies electric power to the AFE 31, the controller 32, the communicator 33, and the operator 34. The power supply 35 is a unit that receives electric power supplied from an external power supply, a primary battery, a secondary battery, a solar cell, an energy harvester, or the like, and supplies electric power to each functional unit in accordance with the instruction of the operator 34.

Figure 20:
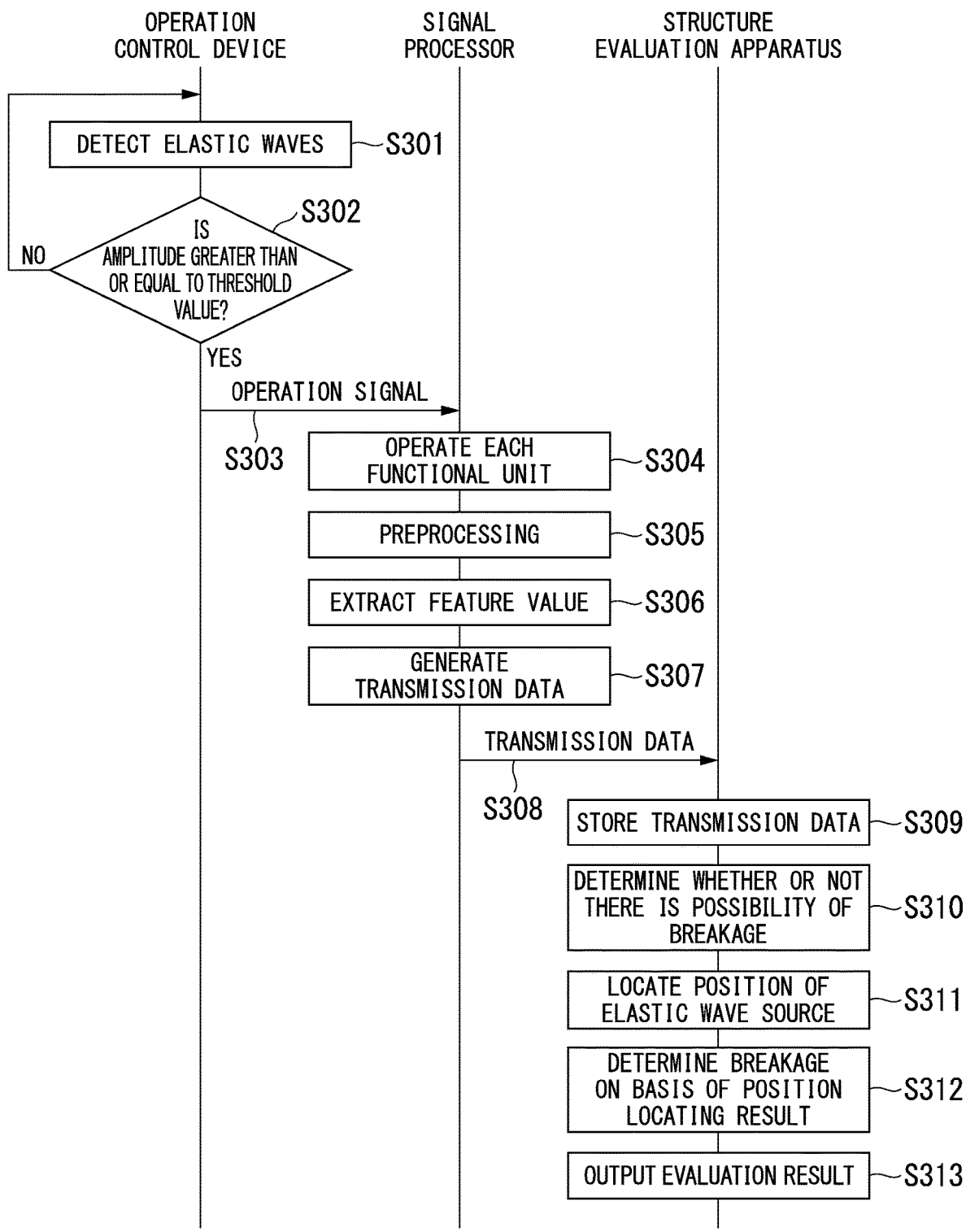
FIG. 20 is a sequence diagram showing a flow of a steel material breakage evaluation process of the structure evaluation system according to the third embodiment.

FIG. 20 is a sequence diagram showing a flow of a steel material breakage evaluation process of the structure evaluation system 100b according to the third embodiment. A case in which the signal processor is in the dormant state at the start of the process of FIG. 20 will be described as an example.

The sensor 51 detects elastic waves generated from the prestressed concrete 10 (step S301). The sensor 51 converts the detected elastic waves into an electrical signal and outputs the electrical signal to the comparator 521. The comparator 521 compares an amplitude of the elastic waves detected by the sensor 51 with a threshold value. The comparator 521 determines whether or not the magnitude of the amplitude of the elastic waves is greater than or equal to the threshold value (step S302). When the magnitude of the amplitude of the elastic wave is not greater than or equal to the threshold value (step S302—NO), the operation control device 50 iteratively executes the processing of steps S301 and 302.

When the magnitude of the amplitude of the elastic waves is greater than or equal to the threshold value (step S302—YES), the comparator 521 notifies the operation controller 522 that the signal processor 30b needs to be operated. The operation controller 522 generates an operation signal. The operation controller 522 outputs the generated operation signal to the signal processor 30b (step S303).

When the operation signal is acquired from the operation control device 50, the operator 34 of the signal processor 30*b* instructs the power supply 35 to supply electric power to put each functional unit in an operating state (step S304). Thereby, the signal processor 30*b* can acquire an AE signal output from the sensor 20.

The AFE 31 performs preprocessing on the AE signal transmitted from the sensor 20 (step S305). Specifically, the AFE 31 performs a filtering process and an analog-to-digital conversion process on the AE signal. The AFE 31 outputs a noise-removed digital signal to the controller 32. The controller 32 receives the noise-removed digital signal output from the AFE 31 as an input and extracts a feature quantity from the noise-removed digital signal (step S306).

The feature value extractor 322 associates the extracted feature quantity with a sensor ID and outputs the extracted feature quantity associated with the sensor ID to the transmission data generator 323. The transmission data generator 323 generates transmission data including the feature quantity output from the feature value extractor 322 (step S307). The transmission data generator 323 outputs the generated transmission data to the communicator 33. The communicator 33 transmits the transmission data output from the transmission data generator 323 to the structure evaluation apparatus 40 (step S308).

The acquirer 411 acquires the transmission data transmitted from the signal processor 30. The acquirer 411 stores the acquired transmission data in the storage 42 (step S309). After the elapse of a first period, the evaluator 412 determines whether or not there is a possibility of a breakage of the PC steel material using transmission data acquired for a second period (step S310). Specifically, the evaluator 412 determines that there is a possibility of a breakage of the PC steel material when a prescribed number of pieces of transmission data or more have been acquired for the second period. In this case, the evaluator 412 causes the position locator 413 to perform a process of locating a position of an elastic wave source. For example, the evaluator 412 outputs the transmission data acquired for the second period to the position locator 413 and issues an instruction for locating the position of the elastic wave source.

The position locator 413 locates the position of the elastic wave source using a plurality of pieces of transmission data acquired for the second period in accordance with the instruction from the evaluator 412 (step S311). The position locator 413 outputs a position locating result to the evaluator 412. The evaluator 412 determines a breakage of the PC steel material on the basis of the position locating result output from the position locator 413 (step S312). The evaluator 412 outputs an evaluation result (step S313). Specifically, the evaluator 412 controls the display 43 so that the evaluation result is displayed. The display 43 displays the evaluation result in accordance with control of the evaluator 412.

According to the structure evaluation system 100*b* in the third embodiment configured as described above, it is possible to evaluate the breakage of the steel material of the prestressed concrete accurately as in the first embodiment.

In the structure evaluation system 100*b*, the signal processor 30*b* is in a dormant state until processing is required, so that power consumption can be reduced.

Specifically, when the signal processor 30*b* is operating, signal processing is performed on the AE signal transmitted from the sensor 20 all the time. Thus, when a large number of elastic waves have been detected by the sensor 20, it is necessary to perform signal processing even if there is no relationship with the breakage of the PC steel material. Therefore, the power consumption has increased. On the other hand, in the third embodiment, the signal processor 30*b* is maintained in a dormant state until a process of the signal processor 30*b* is required and the operation control device 50, which requires less power consumption than the signal processor 30*b*, performs signal detection. When the operation control device 50 determines that the signal processor 30*b* needs to be operated, the signal processor 30*b* is put in the operating state. Therefore, it is not necessary to maintain the signal processor 30*b* in operation at all times. Thus, the power consumption of the structure evaluation system 100*b* as a whole can be reduced.

Hereinafter, a modified example of the third embodiment will be described.

Similar to the evaluator 412 shown in the first embodiment, the evaluator 412 may determine a breakage area of the PC steel material on the basis of a position locating result.

Similar to the evaluator 412 shown in the first embodiment, the evaluator 412 may determine that breakage of the PC steel material has occurred when a prescribed number of pieces of transmission data or more have been acquired for the second period.

Each functional unit of the signal processor 30*b* may be in an operating state at the start of the process in FIG. 20 and may be on standby without performing signal processing. In the case of the configuration as described above, the signal processor 30*b* receives the AE signal output from the sensor 20 all the time. However, the controller 32 does not perform signal processing before an operation instruction is given from the operator 34. When an operation instruction has been issued from the operator 34, the controller 32 performs signal processing.

According to the above-described configuration, it is possible to reduce the power consumption for signal processing.

As in the second embodiment, the signal processor 30*b* may transmit only transmission data necessary for evaluation to the structure evaluation apparatus 40. In this case of the configuration as described above, the transmission data generator 323 of the controller 32 determines whether or not transmission condition is satisfied after an activated state is reached. When the transmission condition is satisfied, the transmission data generator 323 generates transmission data.

According to the above-described configuration, it is possible to reduce the processing load of the structure evaluation apparatus 40 while reducing the power consumption.

The operator 34 may wait until the first period elapses after acquiring the operation signal from the operation control device 50 and put each functional unit in the operating state after the elapse of the first period. Specifically, the operator 34 waits until the first period elapses using a counter on the basis of a point in time when the operation signal has been acquired from the operation control device 50. Also, when the operation signal output from the operation control device 50 includes time information of a point in time when elastic waves having an amplitude value equal to or greater than a threshold value have been detected, the operator 34 waits until the first period elapses using the counter on the basis of the point in time indicated in the time information. The operator 34 puts each functional unit in the operating state after the elapse of the first period. In this case, the controller 32 causes all signals obtained after the operating state is reached to be transmitted to the structure evaluation apparatus 40.

According to the above-described configuration, each functional unit of the signal processor 30a can be put in the dormant state until a timing when data necessary for evaluation is acquired. Thereby, each functional unit of the signal processor 30a is put in the dormant state for as long as possible. Thus, the power consumption can be reduced.

The signal processor 30b and the operation control device 50 may be integrated and configured. In the case of the configuration as described above, an integrated device may not include a sensor 51. The controller 52 determines whether or not to put each functional unit included in the signal processor 30b in the operating state on the basis of an AE signal obtained from the sensor 20.

Hereinafter, a modified example common to the embodiments will be described.

The prestressed concrete 10 is not limited to post-tension type prestressed concrete and may be any concrete as long as it is prestressed concrete in which elastic waves are generated by a breakage of the steel material included inside the concrete. For example, the prestressed concrete 10 may be pre-tension type prestressed concrete.

Each functional unit included in the structure evaluation apparatus 40 may be partially or wholly included in a separate housing. For example, the structure evaluation apparatus 40 may include a controller 41 and a storage 42 and the display 43 may be included in a separate housing. Likewise, each functional unit included in the structure evaluation apparatus 40a may be partially or wholly included in a separate housing. For example, the structure evaluation apparatus 40a may include a controller 41a and the storage 42 and the display 43 may be included in a separate housing. In the case of the configuration as described above, the controllers 41 and 41a transmit the evaluation result and the position locating result to a separate housing. The display 43 included in the separate housing displays the evaluation result and the position locating result.

According to the above-described configuration, the manufacturing cost of the structure evaluation apparatus s 40 and 40a can be limited.

The signal processor 30 and the structure evaluation apparatus 40 may be integrated and configured. The signal processor 30 and the structure evaluation apparatus 40a may be integrated and configured. The signal processor 30b and the structure evaluation apparatus 40 may be integrated and configured.

The controllers 41 and 41a may include an output controller. The output controller controls an outputter so that the evaluation result and the position locating result are output. Here, the outputter includes a communicator and a printer. When the outputter is the communicator, the output controller controls the communicator so that the evaluation result and the position locating result are transmitted to another device. When the outputter is the printer, the output controller controls the printer so that the evaluation result and the position locating result are printed. The structure evaluation apparatus s 40 and 40a may include a part or all of the communicator and the printer as the outputter and execute the above-described operation.

The transmission data generators 323 and 323a may generate warning transmission data indicating a warning when a magnitude of an amplitude included in a feature quantity is greater than or equal to a threshold value on the basis of the feature quantity extracted by the feature value extractor 322. The communicator 33 may transmit the generated warning transmission data to an alarm device (not shown) provided on the prestressed concrete 10 or may transmit the generated warning transmission data to the structure evaluation apparatus s 40 and 40a. When the warning transmission data is transmitted to the alarm device provided on the prestressed concrete 10, the alarm device outputs a warning indicating that there is a possibility of occurrence of a breakage to a nearby area by receiving the warning transmission data. For example, an alarm device may provide a notification of a warning by outputting a sound, may provide a notification of a warning by speech, may provide a notification of a warning by blinking a lamp, or may provide a notification of a warning by changing the color of a lamp. When the warning transmission data is transmitted to the structure evaluation apparatus s 40 and 40a, the controllers 41 and 41a may cause the display 43 to display the warning by receiving the warning transmission data.

According to the above-described configuration, it is possible to provide a notification of a possibility of occurrence of a breakage in advance. Thereby, a staff member at the site can take countermeasures against a breakage in advance, so that the work can be performed efficiently.

Figure 21:
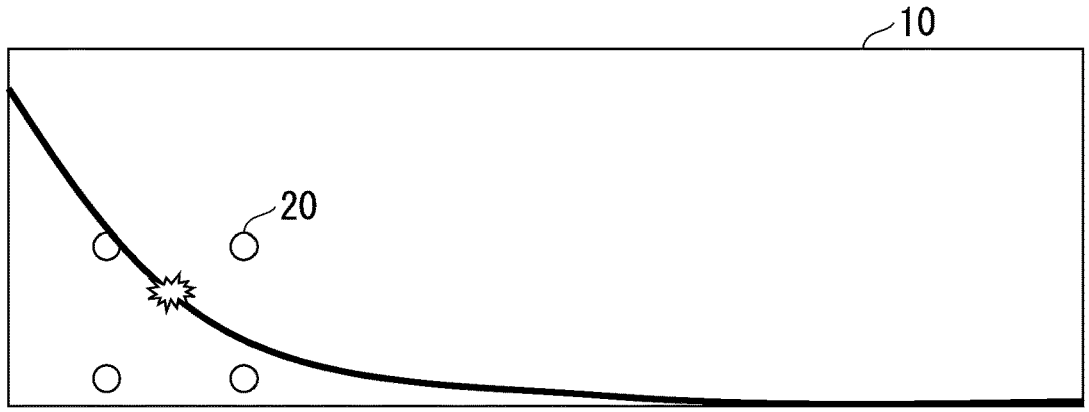
FIG. 21 is a diagram showing an example of another arrangement of sensors according to each embodiment.
Figure 22:
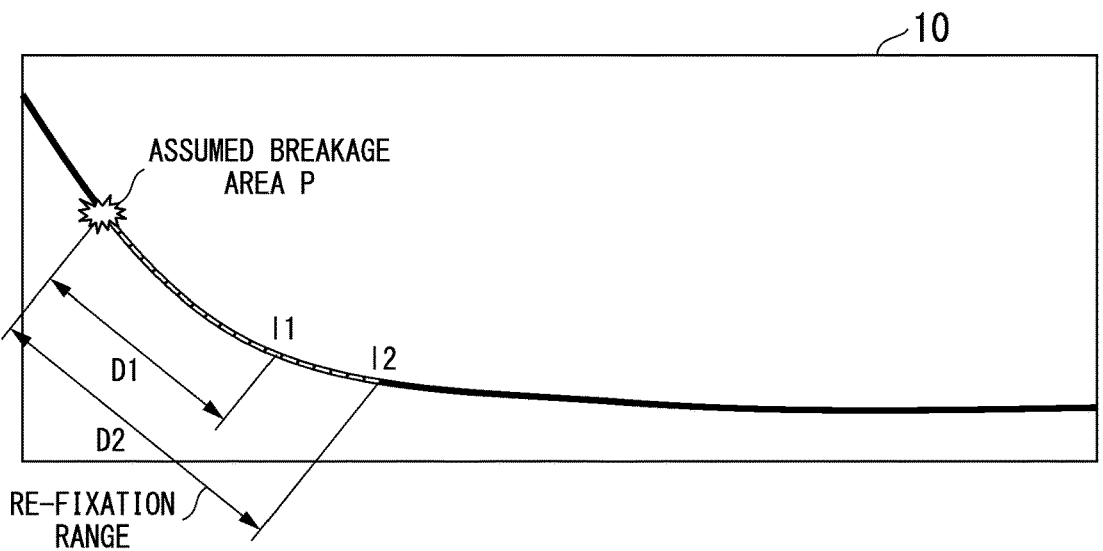
FIG. 22 is a diagram for describing an example of another arrangement of sensors according to each embodiment.

In the above-described example, because no breakage area of the PC steel material is determined, an arrangement on the entire prestressed concrete is required. An infrastructure monitoring system is required to operate autonomously for a long period at low costs. Increasing the number of sensors to be arranged as a whole causes a problem in terms of cost and power consumption. Therefore, the sensors 20 may be arranged as follows in each embodiment. FIG. 21 is a diagram showing an example of another arrangement of the sensors 20 in each embodiment. When the breakage area can be estimated as shown in FIG. 21, an arrangement in which the sensors surround the breakage area is conceivable. However, according to FIGS. 8 and 9, it can be seen that the elastic waves generated due to re-fixation progress with time. Therefore, an assumed breakage area is set to P as shown in FIG. 22 when the breakage area can be estimated, a short re-fixation range is set to D1 (a first distance), a long re-fixation range is set to D2 (a second distance), and re-fixation tips have positions I1 and I2 at the distances D1 and D2 along the PC steel material. Thus, the re-fixation can be effectively determined by arranging the sensors so that at least a line segment of the PC steel material formed by I1 and I2 is included.

Figure 23:
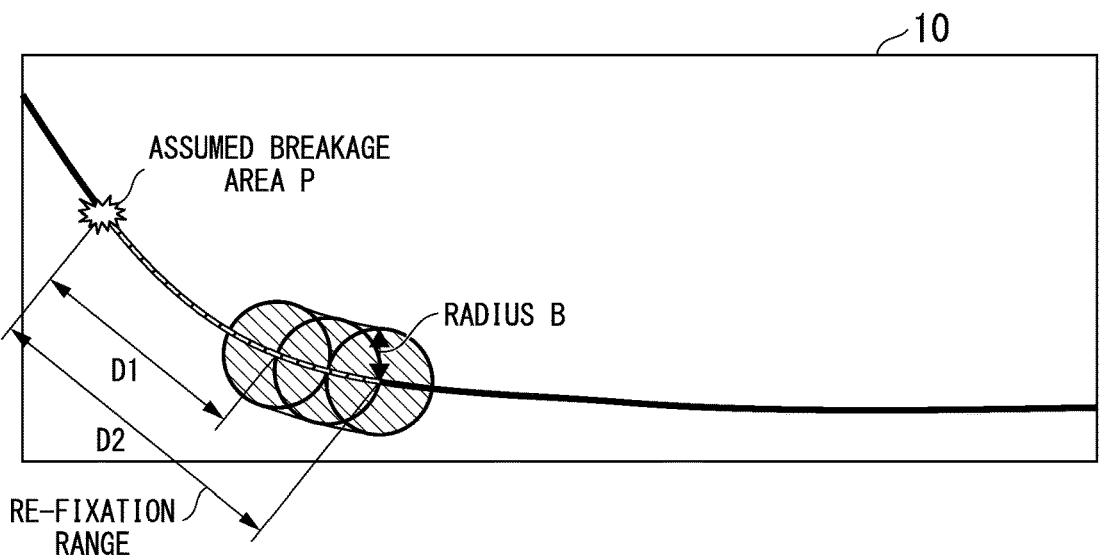
FIG. 23 is a diagram for describing an example of another arrangement of sensors according to each embodiment.

Also, when the sensor 20 detects elastic waves generated due to re-fixation as shown in FIG. 23, the elastic waves are generally attenuated with a distance. Therefore, it is desirable to set an available detection range A and arrange the sensors 20 inside a circle having a diameter A. Thus, it is possible to detect elastic waves efficiently by arranging the sensors 20 inside a plurality of circles having a radius B centered on a prescribed position of a line segment connecting I1 and I2 along the PC steel material.

[Math. 1]

$$y = f(x) \quad (1)$$
$$P = (x_p, y_p)$$
$$D_1 = \int_{x_p}^{x_1} \sqrt{1 + \left(\frac{dy}{dx}\right)^2} \, dx$$
$$D_2 = \int_{x_p}^{x_2} \sqrt{1 + \left(\frac{dy}{dx}\right)^2} \, dx$$
$$I_1 = (x_1, y_1)$$
$$I_2 = (x_2, y_2)$$
$$(x - x_a)^2 + (y - f(x_a))^2 \leq A^2$$
$$x_1 \leq x_a \leq x_2$$

In order to determine the available detection range A for elastic waves, it is necessary to take into account the distance attenuation of elastic waves. Here, an approach using a Q value is proposed. The Q value is an index indicating a distance attenuation characteristic of a material, and is also used for the evaluation of a damping material because the vibration is attenuated faster when the attenuation is faster. When energy E of the elastic waves is lost by ΔE during one cycle, the Q value is defined by the following equation.

[Math. 2]

$$\frac{1}{Q} = \frac{\Delta E}{2\pi E} \quad (2)$$

A plurality of studies on the Q value of concrete have been conducted so far, and based on these previous studies, it is considered that a range in which the Q value of concrete can be taken is about 10 to 40.

It is possible to derive a sensor interval from the sensitivity of the sensor to be used if the attenuation characteristics are ascertained in advance in the approximate range in which the Q value of concrete can be taken. The following equation is used to calculate each spectral ratio $\ln(X_n/X_1)$ in the Q value, i.e., the distance attenuation. In the following equation, f denotes a frequency [kHz] and d denotes a propagation distance [m].

[Math. 3]

$$\ln\frac{X_n}{X_1} = -\frac{\pi f}{v_p Q} d \quad (3)$$

For example, when Q=28.8, it is considered that a frequency component of 80 kHz is attenuated $4.5 \times 10^{-5}$ times at a distance of 5 m. It is possible to obtain the available detection range A for elastic waves from the prestressed concrete, the used sensor, a signal-to-noise (S/N) ratio of the AFE 31, and the like. When the breakage area is estimated, it is possible to visually confirm an arrangement and a dangerous position of the PC steel material by visual inspection or a design drawing or to confirm a state of corrosion with a fiberscope or the like. Also, a filling state can be checked in a method such as an X-ray transmission method, and an estimated breakage area can be obtained.

According to at least one embodiment described above, a plurality of sensors 20 and an evaluator 412 are included. The plurality of sensors 20 detect elastic waves generated in prestressed concrete 10. The evaluator 412 evaluates a breakage of the steel material using elastic waves detected for a second period which is a period after the elapse of a first period from a point in time when a magnitude of the elastic waves detected by the plurality of sensors 20 is greater than or equal to a threshold value. Thereby, it is possible to evaluate the breakage of the steel material contained in the prestressed concrete accurately.

Some functions of the structure evaluation apparatus s 40 and 40b according to the above-described embodiments may be configured to be implemented in a computer. In this case, the functions may be implemented by recording a program for implementing the functions on a computer-readable recording medium and causing a computer system to read and execute the program recorded on the recording medium. Also, the "computer system" described here is assumed to include an operating system (OS) and hardware such as peripheral devices. Also, the "computer-readable recording medium" refers to a flexible disk, a magneto-optical disc, a read-only memory (ROM), a portable medium such as a compact disc (CD)-ROM, or a storage device such as a hard disk embedded in the computer system. Further, the "computer-readable recording medium" may include a computer-readable recording medium for dynamically retaining the program for a short time period as in a communication line when the program is transmitted via a network such as the Internet or a communication circuit such as a telephone circuit and a computer-readable recording medium for retaining the program for a given time period as in a volatile memory inside the computer system including a server and a client when the program is transmitted. Also, the above-described program may be a program for implementing some of the above-described functions. Further, the above-described program may be a program capable of implementing the above-described function in combination with a program already recorded on the computer system or may be a program implemented using a programmable logic device such as a field programmable gate array (FPGA).

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A structure evaluation system comprising:
a plurality of sensors configured to detect elastic waves generated in prestressed concrete in which a prestressed concrete steel material is internally provided;
an evaluator configured to evaluate a breakage of the steel material on the basis of elastic waves detected for a second period, which is a period after a first period has elapsed from a point in time when a magnitude of the elastic waves detected by the plurality of sensors is greater than or equal to a threshold value; and
a position locator configured to locate a position of an elastic wave source using a plurality of elastic waves detected for the second period in each of the plurality of sensors, wherein the evaluator is further configured to:
acquire elastic waves detected during the second period and not acquire elastic waves detected during the first period;
evaluate a breakage of the steel material based on the acquired elastic waves detected during the second period; and
determine that breakage of the steel material has occurred when there are a plurality of elastic wave sources within a given range in an evaluation target area from a position locating result of the position locator,
wherein the first period is 7 ms to 9 ms, and
wherein the second period is 10 ms to 100 s.

2. The structure evaluation system according to claim 1, further comprising:
a signal processor configured to perform signal processing on the elastic waves detected by the plurality of sensors; and
an operation controller configured to cause the signal processor to be operated,
wherein the operation controller outputs an operation signal for operating the signal processor to the signal processor when elastic waves whose amplitude has a magnitude greater than or equal to the threshold value are detected, and
wherein the signal processor performs the signal processing on the elastic waves when the operation signal output from the operation controller has been acquired and transmits a signal after the signal processing to the evaluator.

3. The structure evaluation system according to claim 1, wherein the plurality of sensors are installed so that a first sensor at a position at a first distance from an assumed breakage area of the steel material within the prestressed concrete and a second sensor at a position at a second distance longer than the first distance from the assumed breakage area are included.

4. The structure evaluation system according to claim 1, wherein the plurality of sensors are installed inside each of a plurality of circles centered on a prescribed position of a line segment connecting a position at a first distance from an assumed breakage area of the steel material within the prestressed concrete and a position at a second distance longer than the first distance from the assumed breakage area.

5. A structure evaluation apparatus comprising:
an evaluator configured to evaluate a breakage of a prestressed concrete steel material on the basis of elastic waves detected for a second period, which is a period after a first period has elapsed from a point in time when a magnitude of elastic waves detected by a plurality of sensors is greater than or equal to a threshold value, the plurality of sensors detecting the elastic waves generated in prestressed concrete in which the prestressed concrete steel material is internally provided; and
a position locator configured to locate a position of an elastic wave source using a plurality of elastic waves detected for the second period in each of the plurality of sensors,
wherein the evaluator is further configured to:
acquire elastic waves detected during the second period and not acquire elastic waves detected during the first period;
evaluate a breakage of the steel material based on the acquired elastic waves detected during the second period; and
determine that breakage of the steel material has occurred when there are a plurality of elastic wave sources within a given range in an evaluation target area from a position locating result of the position locator,
wherein the first period is 7 ms to 9 ms, and
wherein the second period is 10 ms to 100 s.

6. A structure evaluation method comprising:
detecting, by a plurality of sensors, elastic waves generated in prestressed concrete in which a prestressed concrete steel material is internally provided;
evaluating a breakage of a prestressed concrete steel material on the basis of elastic waves detected for a second period, which is a period after a first period has elapsed from a point in time when a magnitude of elastic waves detected by the plurality of sensors is greater than or equal to a threshold value;
locating a position of an elastic wave source using a plurality of elastic waves detected for the second period in each of the plurality of sensors;
acquiring elastic waves detected during the second period and not acquiring elastic waves detected during the first period;
evaluating a breakage of the steel material based on the acquired elastic waves detected during the second period; and
determining that breakage of the steel material has occurred when there are a plurality of elastic wave sources within a given range in an evaluation target area from a position locating result of the position locator,
wherein the first period is 7 ms to 9 ms, and
wherein the second period is 10 ms to 100 s.

* * * * *